United States Patent
Nakagawa et al.

[11] Patent Number: 6,069,681
[45] Date of Patent: May 30, 2000

[54] DEVICE FOR IMAGE SHOOTING BOTH SIDES OF DOCUMENTS

[75] Inventors: Tomohiro Nakagawa, Kanagawa; Koji Asako, Tokyo; Keizou Uchioke, Saitama; Masashi Inoue, Saitama; Yasutoshi Kawabata, Saitama, all of Japan

[73] Assignee: Fuji Photo Film Co., Ltd., Kanagawa-ken, Japan

[21] Appl. No.: 08/633,433

[22] Filed: Apr. 17, 1996

Related U.S. Application Data

[63] Continuation-in-part of application No. 08/554,231, Nov. 8, 1995, abandoned.

[30] Foreign Application Priority Data

| Nov. 8, 1994 | [JP] | Japan | 6-274052 |
| Apr. 20, 1995 | [JP] | Japan | 7-119136 |
| Apr. 20, 1995 | [JP] | Japan | 7-119141 |
| Nov. 7, 1995 | [JP] | Japan | 7-313468 |

[51] Int. Cl.[7] .................................................. G03B 27/32
[52] U.S. Cl. ............................................ 355/23; 355/50
[58] Field of Search .................................. 399/364, 372, 399/374; 355/23, 48, 50; 358/498; 348/97, 112

[56] References Cited

U.S. PATENT DOCUMENTS

| 3,580,670 | 5/1971 | Bhagat | 355/3 |
| 4,714,962 | 12/1987 | Levine | 358/209 |
| 4,958,187 | 9/1990 | Tsuchiya | 355/202 |
| 5,136,665 | 8/1992 | Inoue | 382/62 |
| 5,140,365 | 8/1992 | Hashimoto | 355/50 |
| 5,208,627 | 5/1993 | Yoshihara et al. | 355/23 |
| 5,280,321 | 1/1994 | Siryk | 355/23 |
| 5,298,937 | 3/1994 | Telle | 355/23 |
| 5,341,192 | 8/1994 | Wally, Jr. et al. | 355/50 |
| 5,861,904 | 1/1999 | Kamir et al. | 347/239 |

FOREIGN PATENT DOCUMENTS

| 60-154243 | 8/1985 | Japan | G03B 27/50 |

*Primary Examiner*—Safet Metjahic
*Assistant Examiner*—Christopher Mahoney
*Attorney, Agent, or Firm*—Sughrue, Mion, Zinn, Macpeak & Seas, PLLC

[57] ABSTRACT

A novel device for image-shooting both surfaces of documents at a high rate by electronic means. The device has an upper transport system for allowing plural documents to descend/move by a pre-set number at a time towards the downstream and image-shooting means for image- shooting the descending/moving document. Image-shooting can be done simultaneously on both sides or side by side, either during free movement or controlled movement by tranporting means etc.

7 Claims, 19 Drawing Sheets

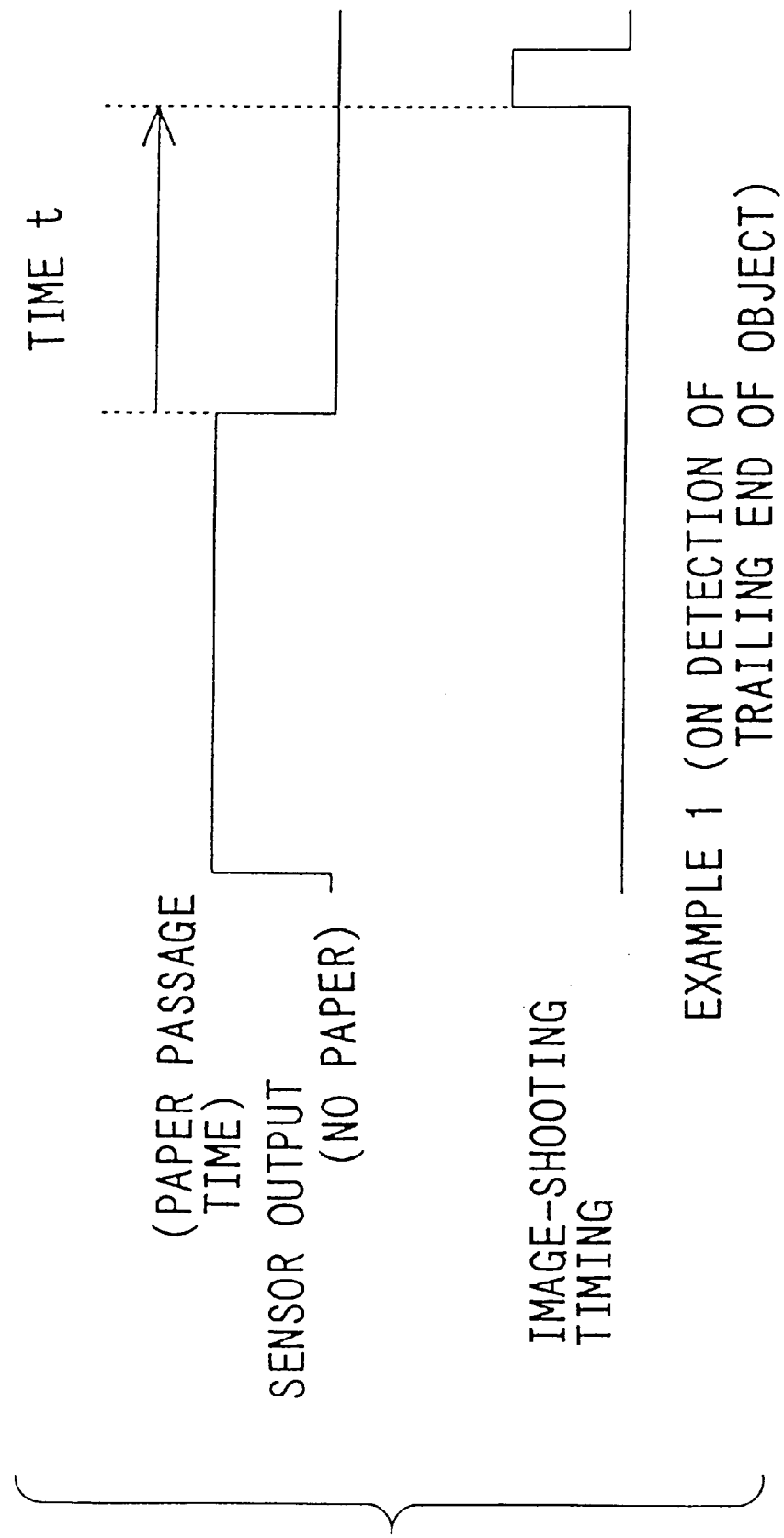

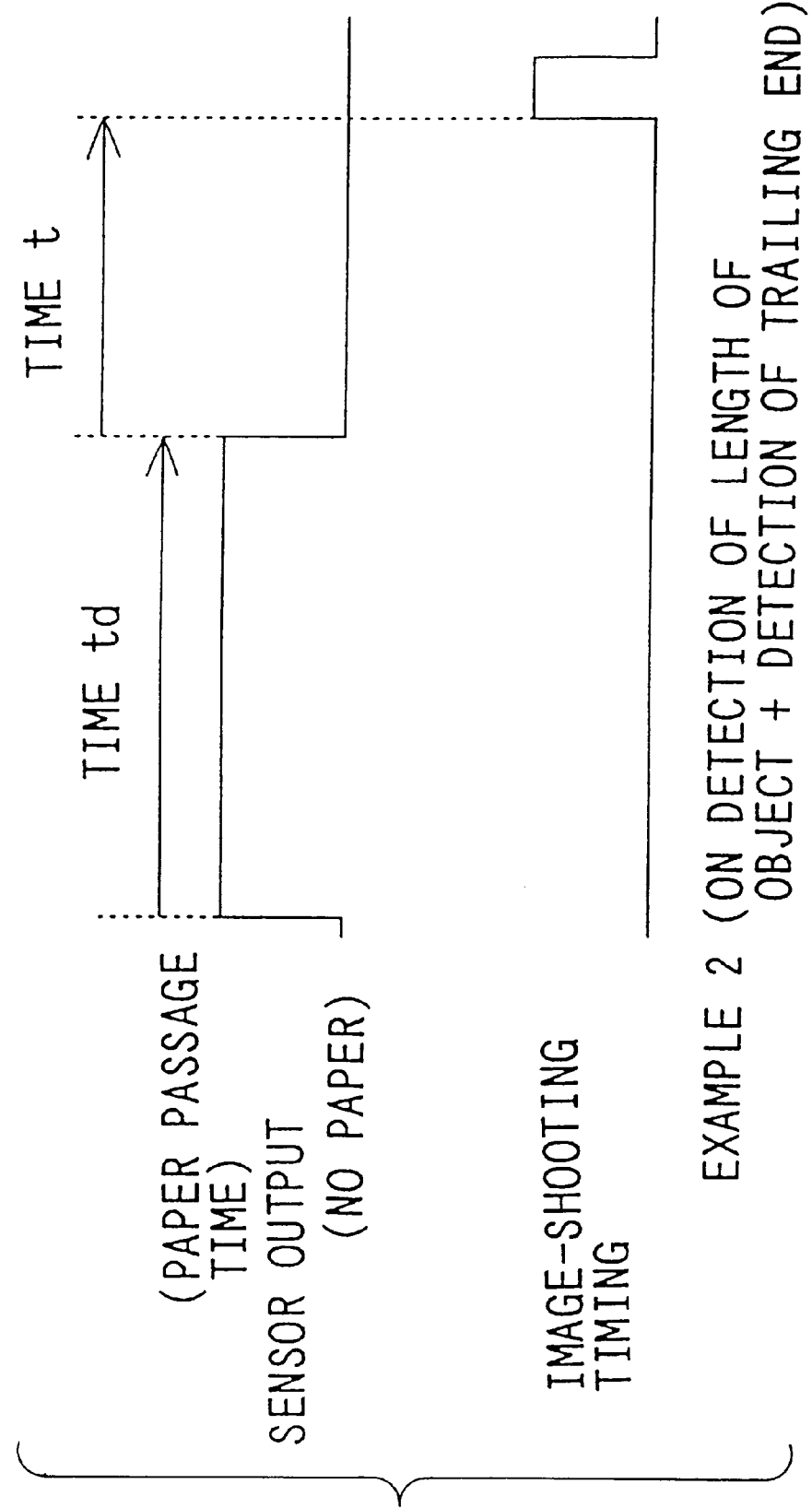

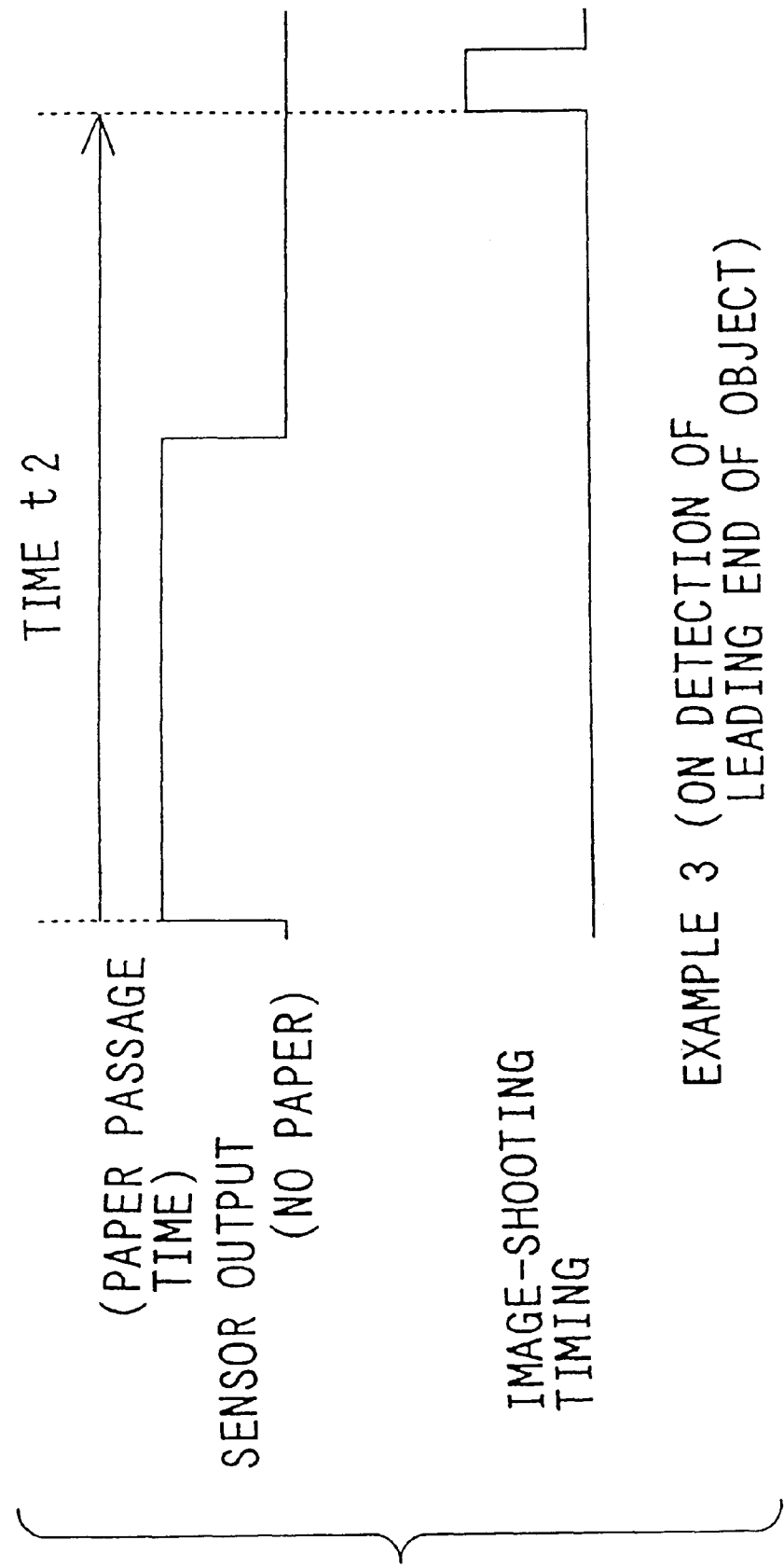

DEVICE FOR IMAGE SHOOTING BOTH SIDES OF DOCUMENTS

This is a Continuation In Part of U.S. Ser. No. 08/554,231 filed Nov. 8, 1995, abandoned.

FIELD OF THE INVENTION

This invention relates to a device for shooting image of a document, an object or the like. More particularly, it relates to a device for image-shooting both sides of a document, such as an instrument. In a further aspect, this invention relates to a method for image-shooting a moving document, such as an instrument, more particularly, to a method for high-speed image-shooting both surfaces of a descending document.

BACKGROUND

As a device for simultaneously photographing both sides of a document, the JP Patent Kokai Publication JP-A-No.60-154243 shows a device having a silver salt film and a slit camera, as shown herein in FIG. 5.

Referring to FIG. 5, the device shown in the JP Patent Kokai Publication JP-A-No.60-154243 has a transporting channel for the document made up of a pair of upper transporting rolls 1A, 1B, a pair of lower transporting rolls 2A, 2B and a pair of cover glass plates 3A, 3B arranged between these transporting rolls. The front and reverse side images of the document travelling through a space between the cover glass plates 3A, 3B are captured on a silver salt film by a slit camera, not shown, via reflecting mirrors 4A, 4B, respectively.

With the above device, since the document is held by at least one of the upper transporting rolls 1A, 1B or the lower transporting rolls 2A, 2B, the photographing means that can be used is necessarily limited to that employing a slit camera.

DISCUSSION ON THE RELATED ART

According to the keen investigation of the inventors, the following drawbacks have been revealed in the related art.

However, the device for simultaneously photographing both surfaces of the document with the aid of the slit camera as proposed in the JP Patent Kokai Publication JP-A-No.60-154243 suffers from a problem that a liquid needs to be employed for developing a silver salt film. Consequently, a demand has been raised for an electronic type (i.e. dry type) device for simultaneously photographing both surfaces of the document. Although a device for simultaneously photographing both sides of the document with the aid of line sensors has also been proposed, the document transporting speed needs to be substantially one-half that of the conventional device, due to constraint imposed by processing time for the line sensors, as a result of which it has not been possible to further expedite the image-pickup process.

In addition, since the line sensor is employed as an image-pickup means in place of photographing means, the document needs to be transported at a speed correctly synchronized with the line sensor readout speed, whereby limitations are further placed on the image-pickup speed.

In a further aspect, there is a conventional photographing system for a document, such as instrument (referred to hereinafter as "instrument"), wherein the contents of the instrument are captured (recorded) by holding an end part of the instrument, transporting the instrument at a velocity sufficient to preclude capturing errors and by photographing the contents of the instruments.

However, with the above conventional instrument photographing system, in which a silver salt film is developed, it is necessary to perform disposal of waste liquid. In addition, the photographing is carried out consecutively without regard to whether or not an object to be image-shot (instrument) is positioned in a line image-shooting range, thus raising the cost. On the other hand, in a system using the line sensor, transport of the instrument and image-shooting by the line sensor need to be fully synchronized with each other, resulting in difficulty in high-speed image-shooting.

SUMMARY OF THE DISCLOSURE

Generally, it is a basic objective of the present invention to provide a novel device for taking image (or picture) of any surface of a document (or any equivalent object) at a high speed under the condition that image can be further processed and/or stored for various needs.

Specifically it is an objective of the present invention to provide a novel device for taking image (or picture) of both surfaces of a document whereby both surfaces of the document can be image-taken at a high speed by electronic means.

It is another objective of the present invention to provide a novel device for taking image of both surfaces of a document whereby both surfaces of the document can be image-taken at a high speed without necessitating a document transporting unit configured for controlling the document feed rate highly accurately.

It is a further objective of the present invention to provide a novel device for simultaneously taking image of both surfaces of a document at a high speed.

In a further (fourth) aspect, it is an objective of the present invention to provide a method (or device) for image-shooting a document whereby picture dropout may be prohibited and a high-quality image may reliably be obtained, even under a high speed image-shooting.

Still further objectives of the present invention will become apparant in the entire disclosure including claims.

According to a general aspect, an image, i.e., two-dimensional image (or picture) can be taken at a high speed on any surface of a moving target matter, typically a document during its quick movement (typically descending movement) at a high speed by image-shooting two-dimensionally any surface of the moving target matter, in which the two-dimensional image-taking is carried out likewise "photographing", typically strobo-photographing but without recourse to a photosensitive film using photosensitive salts, generally termed as "photographic film". The two-dimensional image-taking is carried out under the condition that the image can be generally converted to image signals. Such signals can be directly processed, stored, recorded or further processed without giving rise to the photographic developing process. The two-dimensional image-taking is typically termed as "image-shooting" in the present invention for convenience of illustration, and the image-shooting may be carried out typically using a video camera system.

The two-dimensional image-shooting which is useful in the present invention typically includes an area sensor, e.g., CCD array of a two-dimensional array, but not limited threrto, and generally can be a photo-electronic sensor array capable of the two-dimensional image-shooting. It should be noted, any equivalent means to such CCD array may be further employed according to the present invention as long as the requirements are satisfied.

Typically, a device for image-shooting documents comprises a first (or upper) transport system which feeds documents toward downstream to freely descend by a given number by number of the documents, and an image-shooting system disposed downstream of said upper transport system and adapted to image-shoot at least one surface (or both surfaces) of the descending document.

According to the present invention, various aspects and embodiments are accomplished based on the basic concept.

According to a fourth aspect, the picture drop out at a high speed image-shooting may be eliminated by adjusting the image-shooting timing so that image-shooting will occur at all times when an object to be image-shot is within the image-shooting range.

That is, the fourth aspect of the present invention provides a method for image-shooting a document including means for transporting and causing descent of a document, such as an instrument, a sensor for detecting the document in descent for outputting a detection signal, and an area sensor for image-shooting the document in descent responsive to the detection signal. An image-shooing timing is generated from the detection signal, the area sensor image-shooing the document in accordance with the image-shooting timing.

According to the fourth aspect, the time which elapses as from the time of end of detection of the document until image-shooting is fixed by detecting the descending document and detecting the size of the document along the direction of descent from the duration of detection. Alternatively, the document may be reliably image-shot during descent of the document within the image-shooting range of the area sensor by image-shooting the document in descent after lapse of a preset time as from detection of the leading end or the trailing end of the document along the direction of descent of the document. In either cases, picture dropout is prevented from occurring.

PREFERRED EMBODIMENTS

According to one aspect of the present invention there is provided a device for image-shooting both surfaces of a document having a first transport system for allowing plural documents to descend by a pre-set number and image-shooting system for two-dimensionally image-shooting both sides of a document(s) fed from the first transport system arranged downstream of said upper transporting system. It should be noted that the term "document" represents whatever object of which an image is to be taken in the present invention, generally having a shape of a sheet. The first transport system usually comprises an upper transport system.

In the first aspect, the documents are usually fed from an upper transport system to an image-shooting area. The feeding may be done, e.g., by allowing the documents to freely descend to the image-shooting area or under a controlled speed, as well as in a vertical horizontal direction, or in a tilted or slanted direction.

The image-shooting system comprises two-dimensional image-shooting means such as so-called area sensor or the like which is capable image-shooting the document at least in an areal unit of certain practically useful dimensions, rather than in a linear unit. The image-shooting may be conducted either simultaneouly or alternately in sequence. Also an entire surface or a certain divided part of a document may be shot by one shooting.

In the image-shooting area of the image-shooting system, the document must travel so as not to disturb (shield) essential part of the document containing important information. Such travelling may be, in general, carried out by free descending (falling down) or tranporting the document by any means for controlling the travel (speed) of the document.

According to the first aspect, the freely descending document is image-shot in two-dimensional fashion at once, which eliminates any transport system of document having an exact transport speed as well as eliminates the need for retaining or constraining the document.

Therefore, the desired document transport and image-shooting both at a high speed is accomplished. A preferred variant provides the free-descending of documents in the image-shooting area, which can eliminate any document transport mechanism and is freed of any possible inclusion of such mechanism in a picked-up image.

According to a further variant, provision of a document travel control means which controls the travel of the document fed from the first (upper) transport system within the image-shooting area, timing of shooting is easily matched with the position of the document. In a further variant, the document travel control means transport the document supporting the document, which can provide a right and accurate positioning of the document opposing to the image-shooting system, e.g., at right angles to the axis of the system.

According to a second aspect of the present invention, simultaneous image-shooting is effected on both the sides of a document using two-dimensional image-shooting means such as area sensor etc. Upon shooting, both the surfaces (front and reverse) should be positioned entirely right in the image-shooting area without being shielded or failure. For this purpose, the documents are fed sheet by sheet from the upper transport system, in which the fed document is allowed to freely descend within a space formed between a pair transparent vertical guide members for free descending to reach the image-shooting area, upon which both the entire surfaces of the document are shot at the same time.

In this aspect, there is no need for a specific document transport system which would require a defined precise feed speed, nor a need for retaining the document during the transport or image-shooting, and thus a high speed is achieved for image-shooting of the document.

In the first and second aspects, it is preferred that a pair of light emitting apparatus (or illuminating apparatus) are provided which emit light in response to a detection signal of a sensor for detecting the document position, and a pair of image-shooting system for image-shooting both sides of the document in response to the detection signal of the sensor. The light emitting apparatus are disposed opposing to the document and emit light against both the surfaces of the document just positioned at the image-shooting area. In this manner, both the surfaces of the freely descending document is image-shot at a high speed, yet more, with a high quality without missing part of an image. It is also possible to further store or record the shot-image using, e.g., an area CCD camera as the image-shooting system.

According to a third aspect, there is provided a device for image-shooting both sides of documents, which is mentioned herein as one typical embodiment according to the general aspect, provided that both the surfaces of the document can be image-shot simultaneouly. This aspect provides image-shooting at a high speed, too.

Embodiments according to the fourth aspect will be disclosed at the end of the DETAILED DESCRIPTION OF THE PREFERRED EMBODIMENTS.

In the following meritorious effects of the present invention will be summarized.

According to the present invention, both surfaces of the document may be image-shot using two-dimensional image-shooting system at a high speed, particularly also at the same time. In particular, if a camera employing image-pickup elements, such as area sensors, is employed, it becomes possible to eliminate film developing operations and to expedite the document image-shooting process.

It is preferred to provide a detection sensor for detecting the documents at a position between the upper transport system and the image-shooting system, thereby obtaining a timing for image-shooting, which leads to avoid occurrence of missing part of an image or mixed shot of plural images.

The picture data taken using an area sensor such as a CCD camera may also be magnetically, optomagnetically or optically recorded for facilitating picture editing or retrieval.

Also, the provision of the detection sensor of the document's position provides timing for light emission and image-shooting as well as an optimum illumination to the document just positioned at the image-shooting area.

In addition, by providing two-dimensional image-shooting means, such as an area sensor, it becomes possible to image-shoot the entire surfaces of the document at a time.

According to a preferred embodiment to provide detection of jamming of documents for stopping the operation of the upper transport system, there is no risk to get mixed pictures of documents.

Furthermore, since it is possible to eliminate holding the document according to free descending of the document, an illuminating device and an image-shooting device may be provided facing the object, there is no risk of the holding means being captured in a shot image of the object, so that both surfaces of the document descending at a higher velocity may be image-shot simultaneously.

It is possible to provide the transport control means of the documents within the image-shooting area, easier matching of the shooting timing with the document position. Also right positioning of documents against the image-shooting is possible by the transport control means.

It is preferred each of a pair of the transport control means and the image-shooting means are provided at upstream and downstream respectively, which enables alternate image-shooting each side of the document at right positioning as well as prevention of capturing redundant members in the picture.

It is possible to use blown air to transport the document, particularly in a slanted guide members, which eliminates particular transport mechanism.

Other advantages will become apparent from the entire disclosure.

Preferably, the taken image data are recorded magnetically, opto-magnetically or optically for eliminating the problem of disposal of waste liquid produced with the use of silver salt films thus significantly saving the labor in picture editing and retrieval.

By providing guide members for guiding the document freely descending, the descending document may be positively guided to the image-shooting area without being affected by the wind produced by e.g., a cooling fan provided in the device. Also preferably, the guide members are transparent.

BRIEF DESCRIPTION OF THE DRAWINGS

FIG. 17 illustrates a document image-shooting method according to a first example of the fourth asepct.

FIG. 18 illustrates a document image-shooting method according to a second example of the fourth asepct.

FIG. 19 illustrates a document image-shooting method according to a third example of the fourth aspect.

DETAILED DESCRIPTION OF THE PREFERRED EMBODIMENTS

Figure 1:
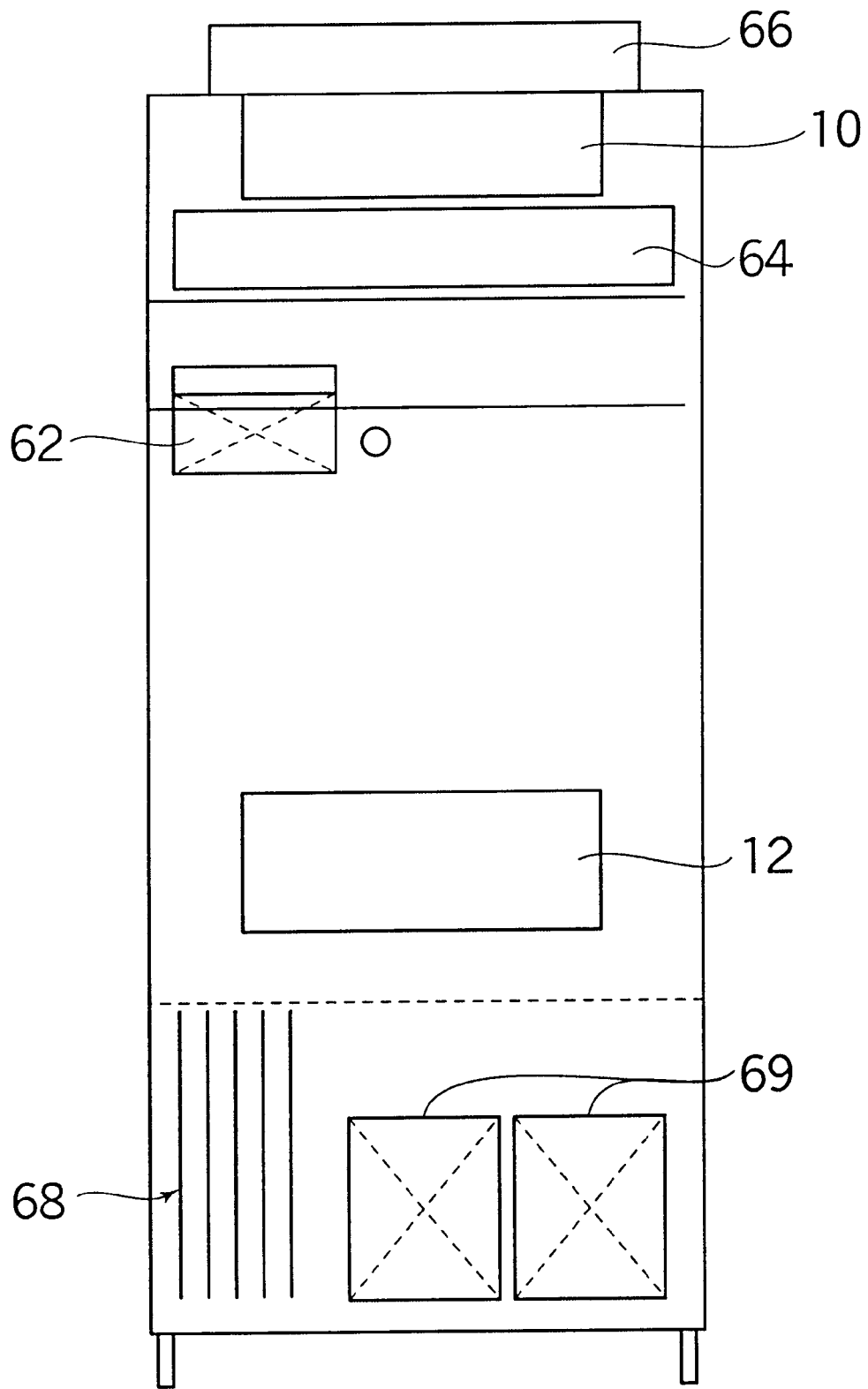
FIG. 1 is a front view of a device for simultaneously image-shooting both surfaces of documents according to an embodiment of the present invention.

Referring to the drawings, preferred embodiments of the device for image-shooting both surfaces of a document according to the present invention will be explained in detail.

Embodiment 1

Figure 2:
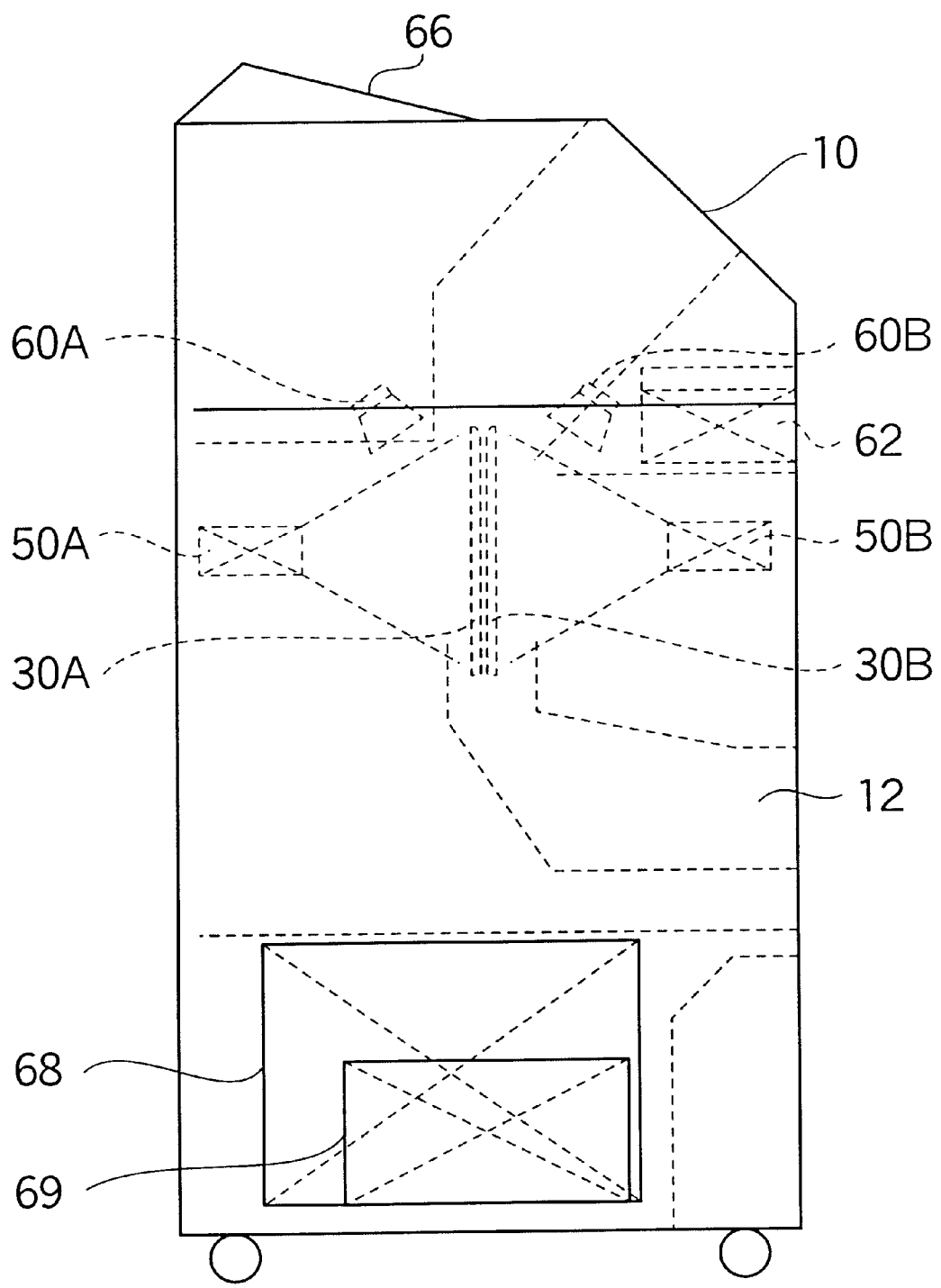
FIG. 2 is a side view of the device for simultaneously image-shooting both surfaces of documents shown in FIG. 1.

FIGS. 1 and 2 are a front view and a side view showing a device for image-shooting both surfaces of documents according to a preferred embodiment of the present invention.

Figure 10:
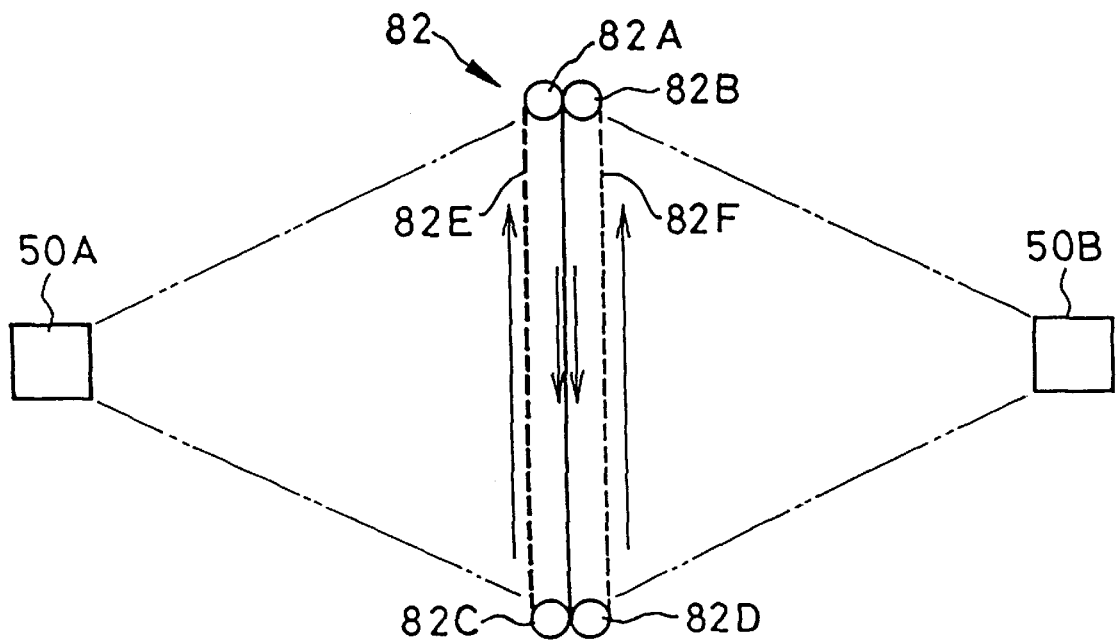
FIG. 10 (*a*) and FIG. 10 (*b*) represent schematic views showing a basic concept of a device for image-shooting both sides of documents according to the fifth embodiment of the present invention, wherein (b) represents a view of a structure of (a) as seen from a video camera 50A.
Figure 10:
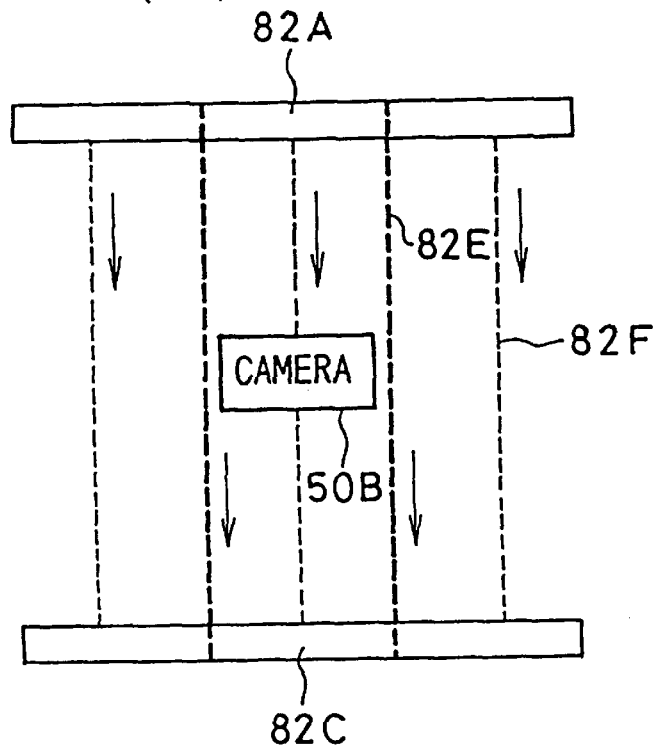

Referring to FIGS. 1 and 2, 10 denotes a document hopper and 12 a document exit opening. 30A, 30B denote target glass plates, and 50A, 50B denote video cameras, while 60A, 60B denote stroboscopic units. On the other hand, 62 denotes a video tape recorder (VTR) and 64 denotes an operating panel, while 66 denotes a liquid crystal display panel. 68 denotes a set of substrates, and 69 denotes a power source block.

Figure 3:
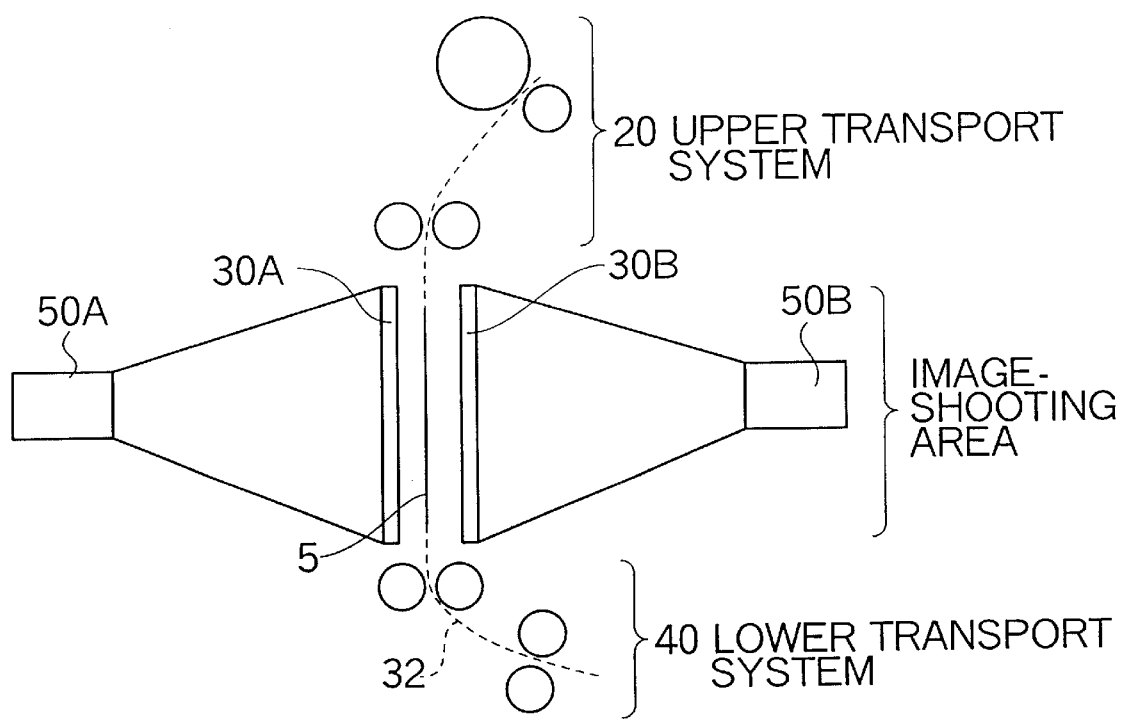
FIG. 3 is a schematic view showing the construction of essential portions of the device for simultaneously image-shooting both surfaces of documents shown in FIG. 1.

FIG. 3 schematically shows essential portions of the construction of the device for image-shooting both surfaces of documents according to an embodiment of the present invention.

Referring to FIG. 3, the device of the illustrated embodiment includes an upper transport system 20, a pair of target glass plates 30A, 30B and a lower transport system 40 that together make up a transporting channel for the documents 32. The upper transport system 20 feeds the documents introduced into the document hopper 10 one by one to a space between the target glass plates 30A, 30B. Each of the target glass plates 30A, 30B has a guide surface larger in area than the document and is arrayed vertically in order to permit free descent (or free fall down) of the document supplied from the upper transport system. The lower transport system 40 receives the document which has descended freely, and transports the document towards the paper exit opening 12.

The video cameras 50A, 50B are arranged facing the target glass plates 30A, 30B, respectively. These video cameras 50A, 50B include an image-taking lens and an area sensor, not shown, having the entire surface of each of the target glass plates 30A, 30B as an image-shooting area, and are adapted for image-shooting the entire areas of the front and back surfaces of the document in synchronism with a time instant when the entire document which freely descends between the target glass plates 30A, 30B enters the image-taking area. The picture signals, indicating the picture of both surfaces of the document, thus, e.g., simultaneously image-taken by the video cameras 50A, 50B, are recorded in the VTR 62.

Figure 4:
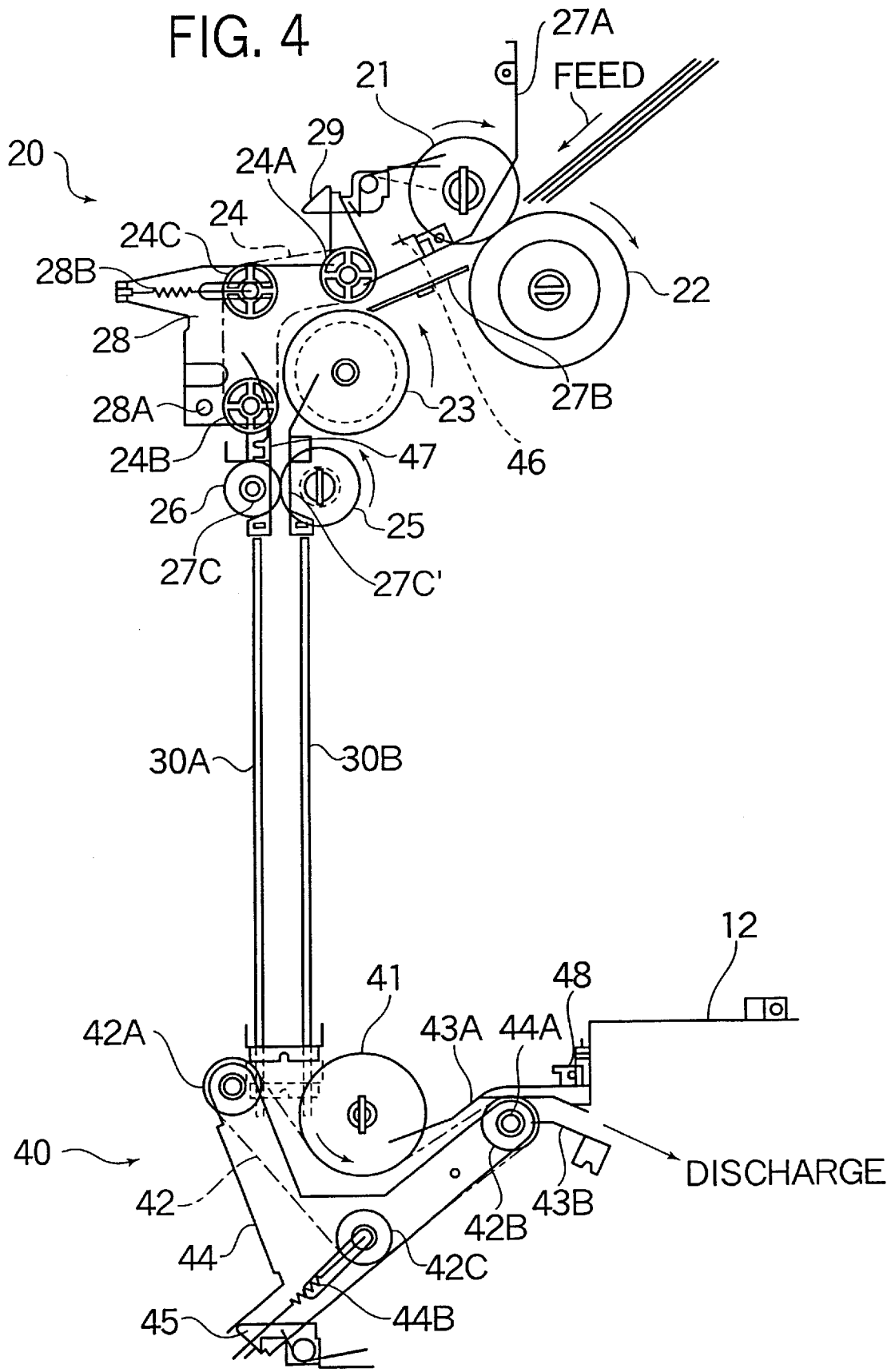
FIG. 4 is a side view showing a detailed construction of a transporting system of the device for simultaneously image-shooting both surfaces of documents shown in FIG. 1.
Figure 5:
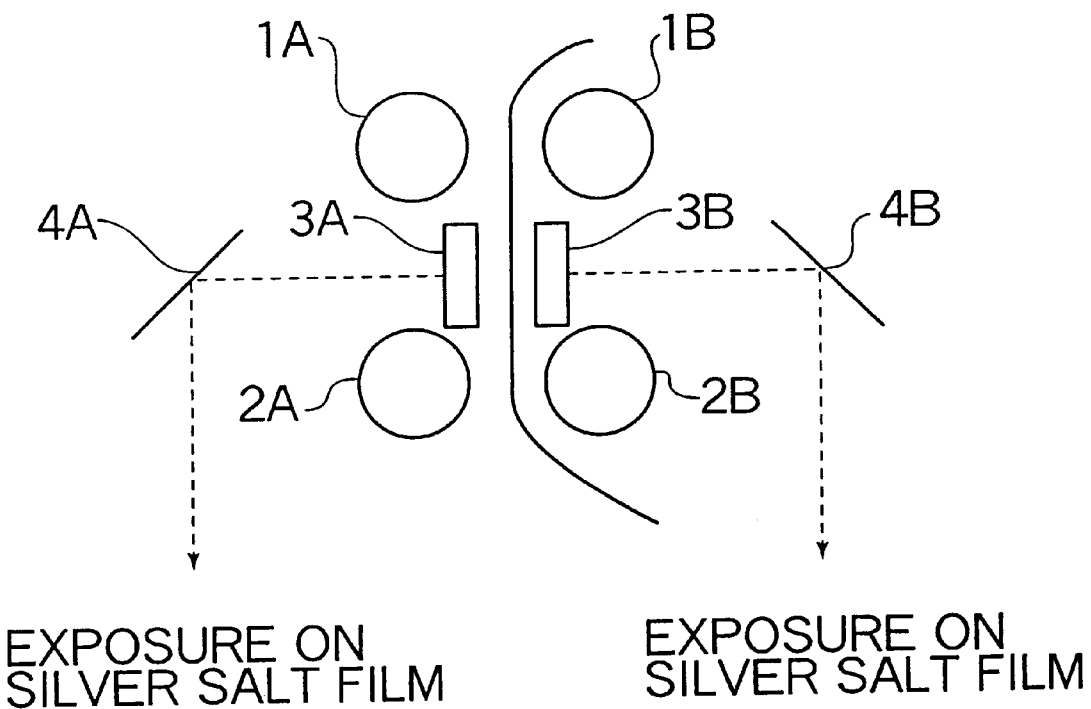
FIG. 5 is a schematic view showing a conventional device for simultaneously image-shooting both surfaces of documents.

A transporting system including the upper transport system 20 and the lower transporting system 40 will be now explained. FIG. 4 illustrates the transporting system embodying the present invention.

Referring to FIG. 4, the upper transport system of the transporting system of the illustrated embodiment mainly includes a feed roll 21, a reverse roll 22, a feed roll 23, a paper feed belt 24, a paper feed side roll 25, a pinch roll 26 and guide members 27A, 27B and 27C etc. The feed roll 21 and the reverse roll 22 are rotated clockwise in FIG. 4 for drawing out only the upper most one of plural stacked documents for sending out the upper most one to a space between the guide members 27A, 27B.

The paper feed belt 24 is placed around three rolls 24A, 24B and 24C. A part of the paper feed belt 24 positioned between the rolls 24A, 24B is adapted for being driven with rotation of the feed roll 23 by being abutted against the feed roll 23. Thus the document fed between the guide members 27A, 27B is transported as it is sandwiched between the feed roll 23 and the paper feed belt 24 so as to be sent out to a space between the guide members 27C, 27C'.

The document sent out to a space between the guide members 27C, 27C' is sandwiched between the paper feed side roll 25 and the pinch roll 26 so as to be sent out to a space between the target glass plates 30A, 30B at a pre-set velocity. When the upper end of the document clears the paper feed side roll 25 and the pinch roll 26, the document freely descends (falls down) to a space between the target plates 30A and 30B with the pre-set velocity as an initial velocity.

On the other hand, the lower transport system 40 is made up mainly of a discharge side roll 41, a paper feed belt 42 and guide members 43A, 43B etc. The paper feed belt 42 is placed around three rolls 42A, 42B and 42C, such that a part of the paper feed belt 42 positioned between the rolls 42A and 42B is caused to bear against the discharge side roll 41 so as to be driven with rotation of the discharge side roll 41. Thus the document freely descending through a space between the target glass plates 30A, 30B is received by and between the discharge side roll 41 and the paper feed belt 42 so as to be discharged to the paper exit opening 12 via a space between the guide members 43A and 43B.

The three rolls 24A, 24B and 24C, around which is placed the paper feed belt 24, are retained by a roll supporting plate 28 rotatably disposed about a pivot 28A. The roll supporting plate 28 is adapted for being locked or unlocked by a lock member 29. Thus, if paper stuffing, for example, is incurred in the upper transporting system 20, such paper stuffing may be eliminated by releasing the locked state maintained by the lock member 29 and by turning the roll supporting plate 28 counterclockwise about the pivot 28A. On the other hand, a spring 28B is installed between the roll supporting plate 28 and the roll 24C for adjusting tension of the paper feed belt 24.

The three rolls 42A, 42B and 42C, around which is placed the paper feed belt 42, are retained by a roll supporting plate 44 rotatably disposed about a pivot 44A as a center of rotation. The roll supporting plate 44 is adapted for being locked and unlocked by a lock member 45. Thus, if paper stuffing, for example, is incurred in the lower transporting system 40, such paper stuffing may be eliminated by releasing the locked state maintained by the lock member 45 and by turning the roll supporting plate 44 counterclockwise about the pivot 44A. On the other hand, a spring 44B is installed between the roll supporting plate 44 and the roll 42C for adjusting tension of the paper feed belt 24.

Figure 6:
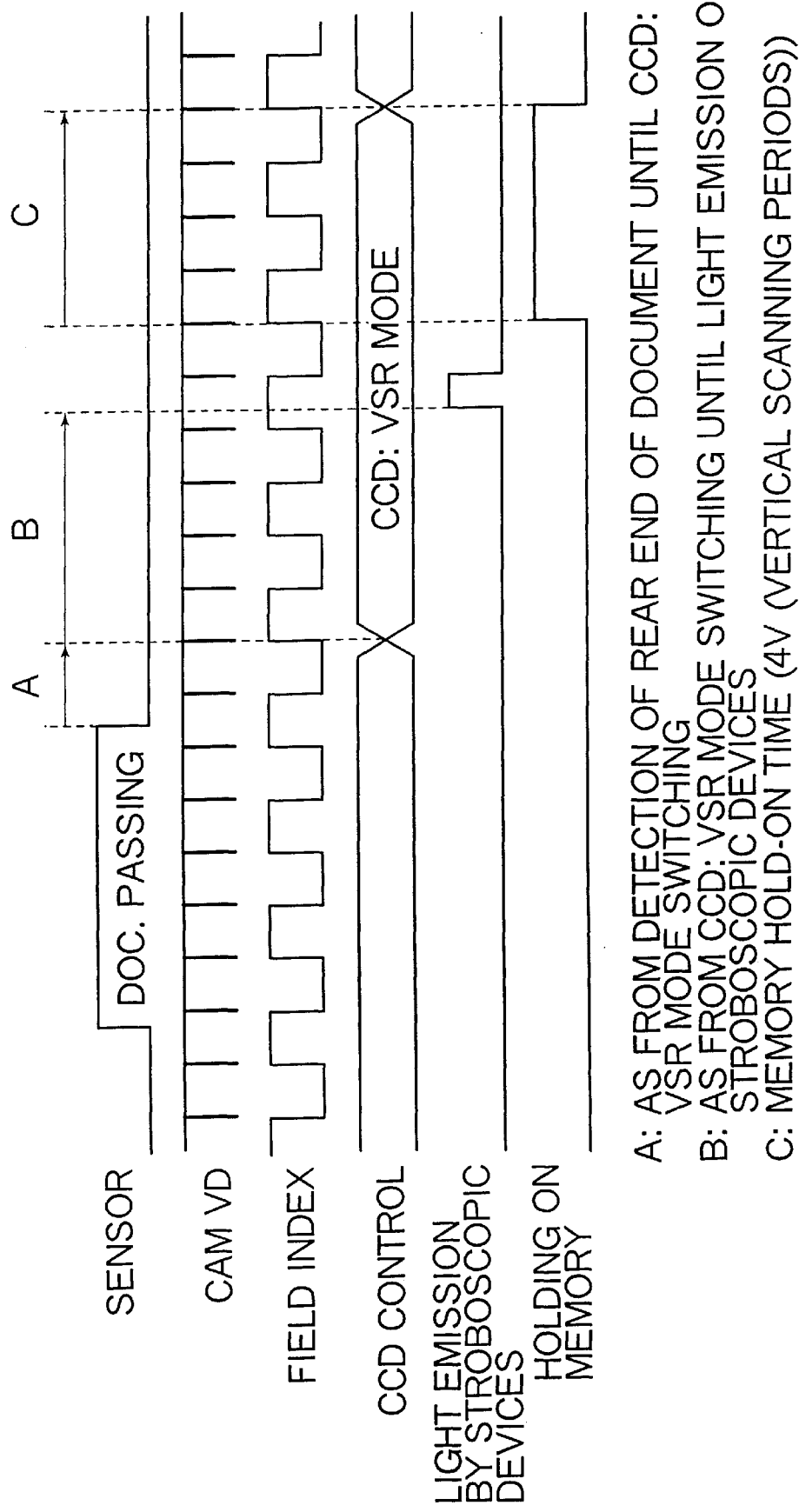
FIG. 6 is a timing chart for illustrating the operation of a device for simultaneously image-shooting both surfaces of documents according to an embodiment of the present invention.

In the above-described document transport system, three optical sensors 46, 47 and 48 are provided for optically detecting the document. When the document so far detected by the optical sensor 47 ceases to be detected, a CCD picture capturing mode is established after lapse of time A as from the time instant of cessation of detection, as shown in FIG. 6. After lapse of a further time B, that is in synchronism with free descent of the document to a space between the target glass plates 30A, 30B to an image-shooting area (which may be called as) "photographing area", too), the stroboscopic units 60A, 60B shown in FIG. 2 emit light. Since the light emission time duration of the stroboscopic devices 60A, 60B is approximately 100 μs or less, a target, object to be image-taken, herein a document, moving at a velocity of approximately 80 cm/sec, may be captured as a still picture. This enables both sides of the document to be "image-shot" simultaneously by video cameras 50A, 50B. Since the initial velocity of document is known, the time as from the time instant the document ceases to be detected by the optical sensor 47 until the time the document enters the photographing area can be pre-set. On the other hand, since the document descends with a certain initial velocity which is defined by the upper transporting system, it may be prohibited from being caught between the target glass plates 30A and 30B.

On the other hand, paper stuffing, for example, may be detected by the optical sensors 46 to 48. That is, if the optical sensor 47 fails to detect a document within a pre-set time as from detection of the document by the optical sensor 46, it is judged that paper stuffing has occurred in the upper transport system 20. Similarly, if the optical sensor 48 fails to detect a document within a pre-set time as from detection of the document by the optical sensor 47, it is judged that paper stuffing has occurred in the lower transport system 40. On detection of the paper stuffing, document transport is halted urgently.

FIG. 6 shows, by a timing chart, detailed operation of the device for simultaneously image-shooting both surfaces of documents embodying the present invention. The video cameras 50A, 50B each include an area CCD camera as image-shooting means. The image signals picked up by the area CCD camera are magnetically recorded via a magnetic recording device, e.g., the VTR 62 shown in FIG. 1.

Referring to FIG. 6, the first row shows an output signal waveform of the optical sensor 47 which outputs a high level signal during passage of the document, that is on detection of the document.

The second row shows a CAM VD signal waveform, that is vertical synchronizing signals (signals having a period of 1/60 second) employed in the video cameras 50A, 50B of FIG. 2 and in the VTR 62 of FIG. 2 for recording the picture signals.

The third row shows a field index signal waveform, that is a signal outputted by an area CCD camera controller, not shown. The field index signal is a reference signal for furnishing image-shooting timing of the area CCD camera.

The fourth row shows a CCD control signal waveform specifying the read-out precision of picture signals outputted by the area CCD film. A signal waveform portion beginning at the left end of the waveform up to the end of a period A specifies an usual read-out precision (usual mode), whereas a signal waveform portion beginning at the beginning end of a period B up to the end of a period C specifies a high resolution mode (CCD:VSR mode).

The fifth row shows a light emission signal waveform of the stroboscopic devices 60A, 60B of FIG. 2, with the width of a sole pulse denoting the light emission period of time on the order of about 100 μs or less.

The sixth row shows a memory capture signal waveform, with a sole pulse denoting that picture signals picked up by the CCD camera has been captured.

The optical sensor 47 outputs a high level signal and a low level signal during a period of time the document passes through a sensing area and after the document has passed through the sensing area, respectively. After lapse of the time period A since the time of transition of the sensor output signal waveform from the high level to the low level, the device is changed over to an picture signal capture mode at high resolution for image-shooting. After the period B has further elapsed, the stroboscopic devices 60A, 60B shown in FIG. 2 emit light and, substantially in synchronism with light emission, the area CCD camera effects image-shooting. At a time instant one-document picture signals have been stored in a temporary storage circuit (memory means), not shown, connected to the area CCD camera, the one-document picture signals are captured by a memory, not shown, in synchronism with rise of the next field index signals (and CAM VD signals). This memory, not shown, is connected to the VTR 62 of FIG. 2.

The length of the period B and that of a period (A+B) are set so that the light will be emitted at a timing the document is positioned in the image-shooting area, depending upon the length of the document (or the high-level period of the sensor output signal waveform) or further the initial velocity of the document during free descent as explained previously.

It is possible with the device for simultaneously photographing both surfaces of the document of the present embodiment to transport the document at a high velocity of 80 cm/sec and to effect image-shooting at a higher rate of four documents per second. Although the video cameras (area CCD cameras) are employed as image-shooting means in the present embodiment, still cameras or the like employing no silver salt film, for example, may also be employed within the scope of the invention.

Although the foregoing description has been made with reference to a preferred embodiment of the present invention, the present invention comprises various other modifications which are pursuant to the principe of the invention.

Embodiment 2

Figure 7:
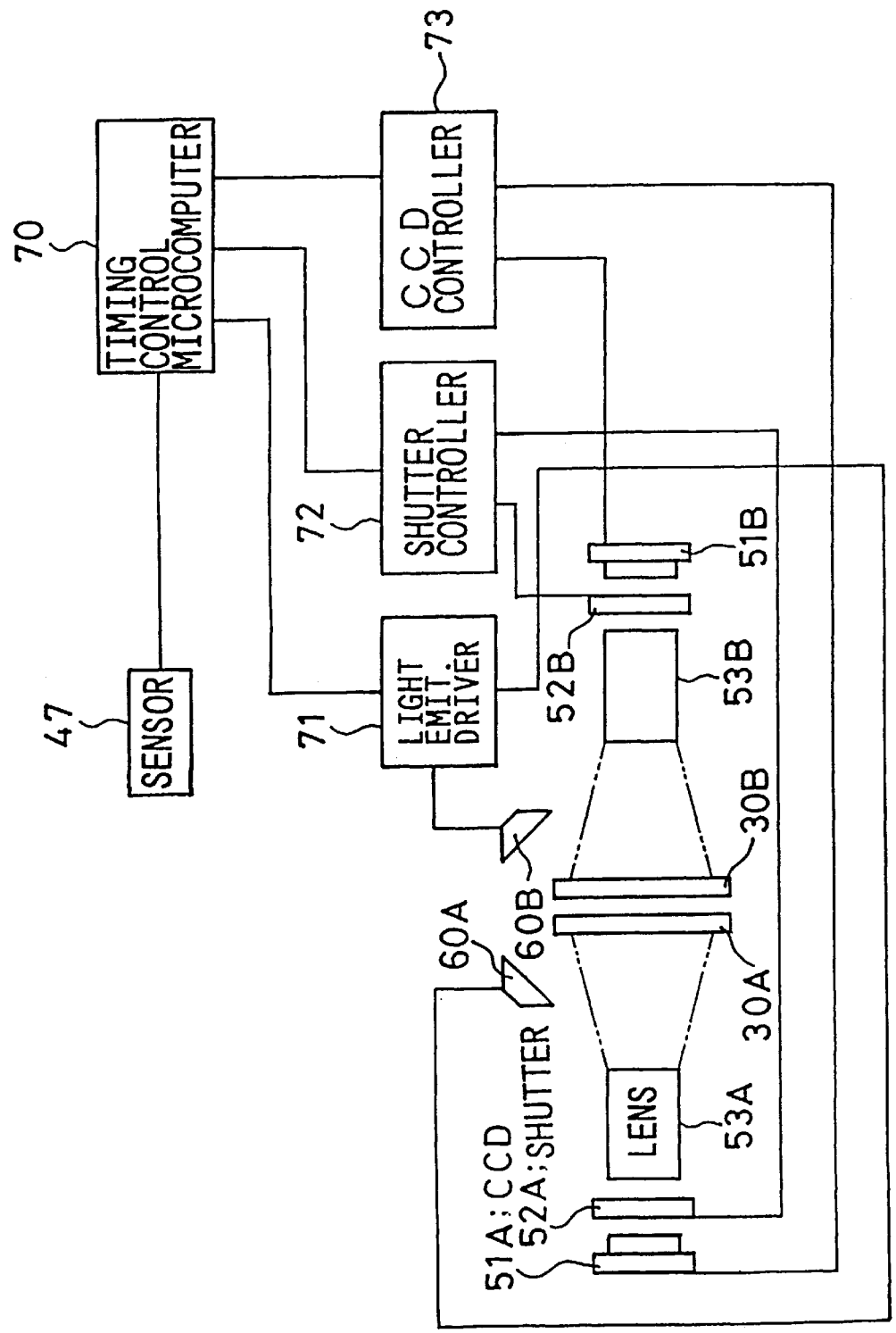
FIG. 7 is a schematic view showing a basic concept of a device for image-shooting both sides of documents according to the second embodiment of the present invention.

FIG. 7 is a schematic block view showing a basic structure of a device for image-shooting both sides of documents according to the second embodiment of the present invention.

Referring to FIG. 7, the image-shooting device comprises an upper transport system 20 (refer to FIG. 3), not shown here, which supplies documents (object to be image-shot), and an optical sensor 47 detecting the documents. The detected signals (document-detecting signals) outputted from the sensor 47 is fed to a timing control microcomputer 70 which outputs are fed to a light emitter driver (termed as "light emit driver" hereinafter) 71 as a light emitter driver, a shutter controller 72, and a CCD controller 73 as an image-shooting means controller, respectively. Outputs of the light emit driver 71, shutter-controller 72 and CCD controller 73 are fed to a pair of light emitting apparatus disposed opposing to each other interposed with and centering at the transport (travel) pathway of documents, i.e., light emitters 60A, 60B, shutter 52A, 52B and CCD 51A, 51B as image-shooting means, respectively. Based on the document-detecting signals of the sensor 47, the timing control microcomputer 70 defines the timings at which light emit driver 71, shutter controller 72, and CCD controller 73 drive light emitters 60A, 60B, shutter 52A, 52B and CCD 51A, 51B, are driven, respectively. A pair of glass plates 30A, 30B are disposed with the document pathway intervening at the image-shooting area, and a pair of lens systems 53A, 53B are disposed between the glass plate 30A and the shutter 53A and between the glass plate 30B and the shutter 53B, respectively.

Based on the document-detecting signals, the timing control microcomputer 70 provides the strobo-driver 71, shutter controller 72 and CCD controller timings at which the light emitters 60A, 60B, the shutters 52A, 52B and CCDs 51A, 51B are driven, respectively. Thereupon the light emitters 60A, 60B emit light continuously or intermittently depending on driving signals supplied by the light emit driver 71, to illuminate the document just positioned within the image-shooting areas of CCD 51A, 51B, respectively; with the shutter 52A, 52B being driven to open according to driving signals outputted from the shutter controller 72 so as to enable the CCDs 51A, 51B to image-shoot. Thus CCDS 51A, 51B image-shoot both the sides of the document simultaneously during the times the document is illuminated and the shutters 52A, 52B are open. The shutters may be operable physically, mechanically or electronically.

In case where 60A, 60B illumination apparatus which emit light continuously with stationary light emission are used as the light emitters, shutters 52A, 52B are used as shown in FIG. 7. Alternatively, in case where stroboscopes are used, shutters 52A, 52B and the shutter controller are unnecessary.

As for the shutters 52A, 52B which are disposed between the CCD and the document and open and close in synchron with the optical sensor 47, any one may be selected from those of mechanical shutters, liquid crystal shutters and electronic shutters of CCD.

In case where the mechanical shutter or liquid crystal shutter is employed, shutter driving signals are outputted to the shutter controller 72 at a proper timing from the timing control microcomputer based on an output signal from the optical sensor 47. In such a manner, the shutters 52A, 52B open at the time instant the document is positioned at the shootable area during the travel, a still picture of the travelling document is "image-shot" (captured) by CCDs 51A, 51B.

In case where the electronic shutter is employed, the amount of light exposure can be adjusted substantially in the same fashion as the case with the mechanical shutter etc., by varying the accumulation time of incident light, e.g., to values of $1/60$, $1/120$ to $1/10000$. In a state where the electronic shutters are so-called not "open", the light received by light-receiving parts of CCDs 51A, 51B is drained to shutter drains, not shown, so as not to be accumulated as image signals.

As for the following embodiments 3 to 10, the structures of the image-shooting area and the neighboring areas may be replaced with those disclosed in FIGS. 3 and 4 of Embodiment 1, or FIG. 7 of Embodiment 2, at needs. In the following disclosure, in Embodiment 3 to 10, partially eliminated are the disclosures which would constitute duplication with Embodiments 1 and 2.

Embodiment 3

Figure 8:
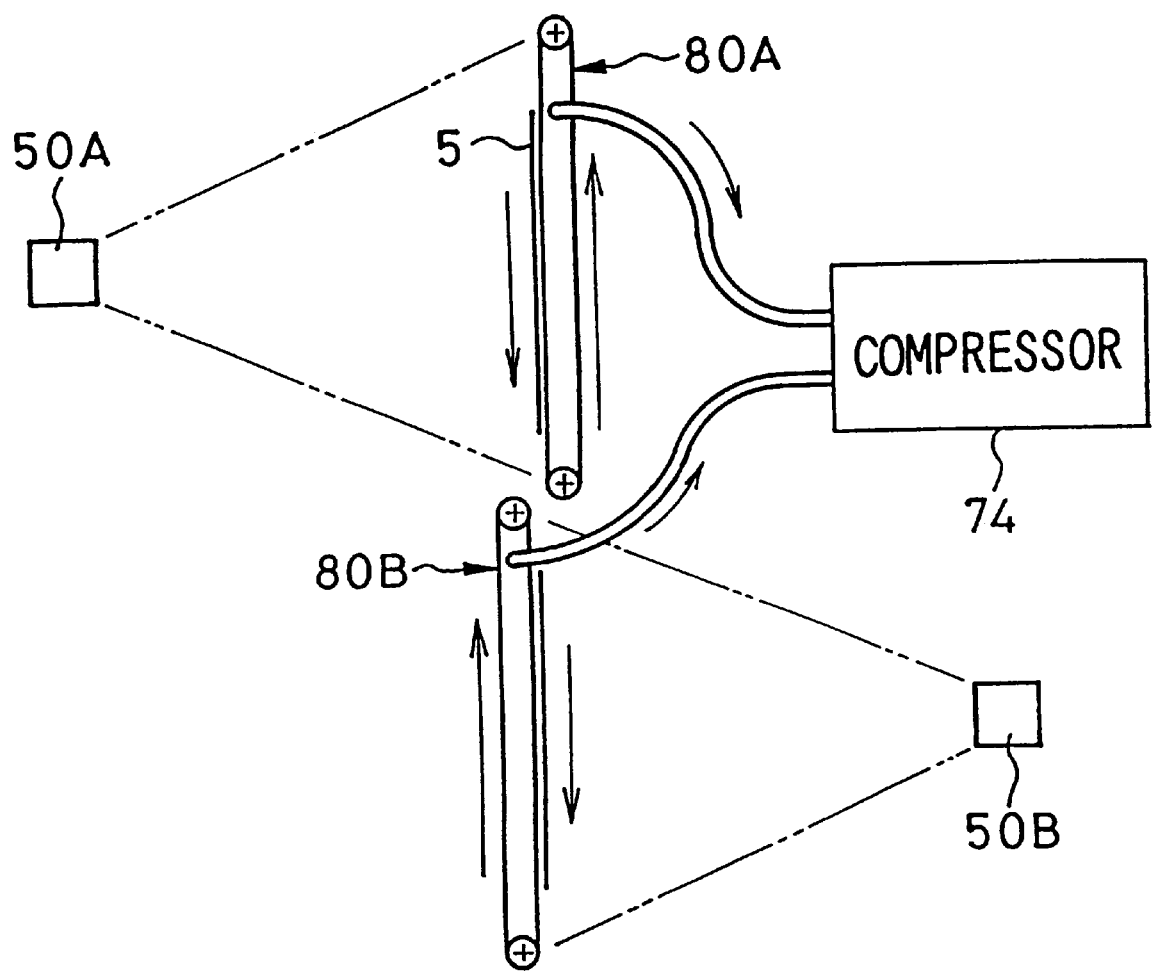
FIG. 8 is a schematic block view showing a basic concept of a device for image-shooting both sides of documents according to the third embodiment of the present invention.

FIG. 8 is an illustrative view showing an image-shooting device of both sides of documents according to the third embodiment of the present invention. In the figure, arrows represent circulating directions of perforated belts 80A, 80B.

Referring to FIG. 8, an image-shooting system according to this embodiment comprises perforated belts 80A, 80B of which one 80A is disposed at the upstream side, with the other one 80B being disposed at the downstream side at a different height along the pathway of documents 5 and at different sides opposing each other centering at the pathway. The perforated belts 80A, 80B circulate in directions that allow the document fed or transported to travel toward the downstream (along the arrows in FIG. 8), respectively. Through pores disposed in the perforated belts 80A, 80B, the document is inspired and adhered onto the surface of the perforated belts 80A, 80B by means of inspiring force of evacuated air produced by a compressor. Either one of video cameras 50A, 50B is disposed opposing the inspiring surface of each of the belts, to which inspiring surface the document 5 is inspired. Picture angles of the video cameras 50A, 50B are illustrated by two-dot-lines which extend from each of video camera 50A, 50B toward the perforated belts 80A, 80B.

The perforated belts 80A, 80B comprise a number of pores for inspiring air, not shown, whereas an air-inspiring box is interposed, which communicates with the compressor 74, within a space defined by two side walls of the endless belt 80A or 80B (a space between two rolls for driving the belt) and two inner sufaces of the belt.

At the upstream part of the present image-shooting system, the document 5 fed from the upper transport system 20 (refer to FIG. 3) is inspired and drawn to the perforated belt 80A through air-inspiring force produced by the compressor 74, whereupon the document 5 travels at the same speed as the perforated belt 80A toward the downstream.

The video camera 50A shoots an image (picture) of the other surface (free surface) of the inspired surface of the document 5 based upon an output of the optical sensor 47 (vid.FIG. 7) at a perdetermined timing. The image-shot document 5 thus on the other surface is further transported toward the perforated belt 80A disposed at the downstream, where further image-shooting is carried out on the first-inspired surface (now free surface) of the document 5, consecutively. The other operations are substantially the same as the case with the upstream.

According to this embodiment, the travel speed of the document is regulated by the perforated belt 80A, 80B wihtin the image-shooting area, resulting in an easier synchronization of timing between the transport and the image-shooting. Yet more, the image-shooting takes places under the inspired (abutted) state of the document to the perforated belt 80A, 80B, thereby providing a further improved picture due to the exact posture setting of the document, e.g., extending at right angles to the axis of the camera (direction of image-shooting).

Embodiment 4

Figure 9:
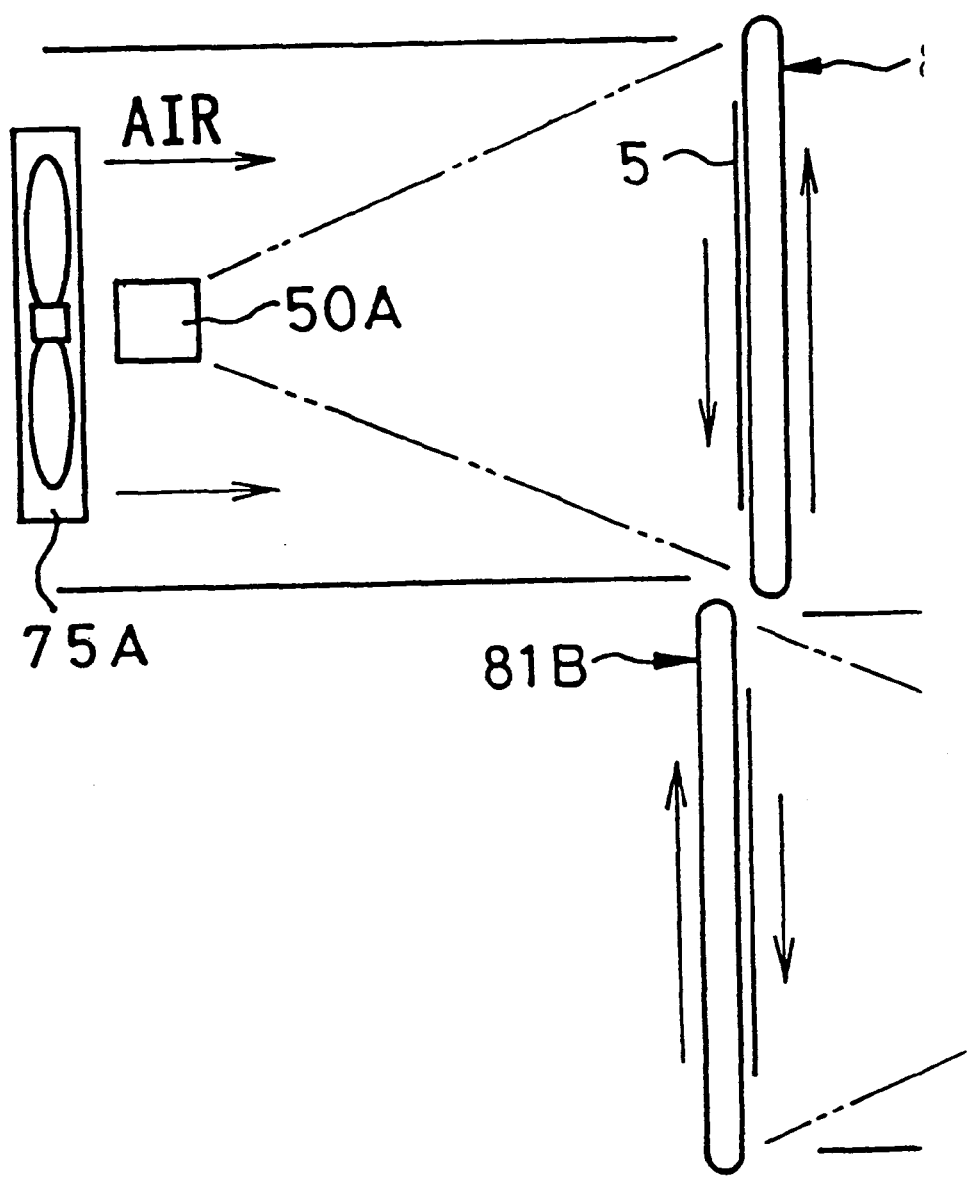
FIG. 9 is a block diagram showing a basic concept of a device for image-shooting both sides of documents according to the fourth embodiment of the present invention.

FIG. 9 represents a schematic view showing the fourth embodiment of the present invention. Arrows in the figure represent the direction of circulation of belts 81A, 81B. In the following duplicated parts as Embodiment 3 will be abridged in the description.

Referring to FIG. 9, in place of the perforated belts 80A, 80B and the compressor 74, nonperforated belts 81A, 81B are disposed, and fans 75A, 75B are disposed behind video cameras 75A, 75B for blowing air toward the document 5 during travel, so as to urge (apply pressure to) the document 5 towatrd the transporting belts 81A, 81B.

Other operation and function and effects are obtainable likewise Embodiment 3.

Embodiment 5

FIG. 10 (*a*) and FIG. 10 (*b*) represent a schematic concept of the fifth embodiment accroding to the present invention, in which (b) is a view of the structure of (a) as seen from the video camera 50A. Arrows shown in the figures show the directions of circulating movement of transparent strings (or wires) 82E, 82F.

Referring to FIG. 10 (*a*) and FIG. 10 (*b*), an image-shooting system of the present embodiment comprises a transporting mechanism 82 disposed along the pathway of the document 5, a pair of video cameras 50A, 50B opposing the transporting mechanism 82. One (first) part of the transporting mechanism is made up of upstream roll 82A, downstream roll 82C, and transparent endless strings (or wires) 82E driven by the rotating rolls 82A, 82C. The other (second) part of the transporting mechanism 82 is made up of upstream roll 82B, downstream roll 82D, and transparent endless strings (or wires) 82F driven by the rotating rolls 82B, 82D. The transparent strings 82E, 82F are disposed intermeshingly along the axis of the rolls 82A etc., each one being disposed at each end of the roll axis, with one being at the mid of the roll axis, making in total 3 strings at the second part, between which 3 strings are disposed in total two transparent strings 82E at the first part. As shown by the arrows in FIG. 10 (*b*) the transparent strings 82E, 82F both travel downstream interposing the document 5 between the strings 82E and 82F.

Accordig to the present embodiment, the document fed from the upper transport system (FIG. 3) is transported by rolls 82A, 82B, and further by the transparent strings 82E, 82F interposed therebetween. The transparent strings 82E and 82F transport the document toward the downstream being intermeshing disposed each other and interposing therebetween the document. The video cameras 50A, 50B shoot images (pictures) on one and the other surfaces of the document during its transportation by means of the transparent strings 82E, 82F.

According to the present embodiment, the travel speed of the document is regulated by the transparent strings which do not appear in a taken picture, thereby providing an easier setting of timing between image-shooting and transporting as well as an easier image-shooting on both sides, particularly, simultaneous two-side shooting.

Embodiment 6

Figure 11:
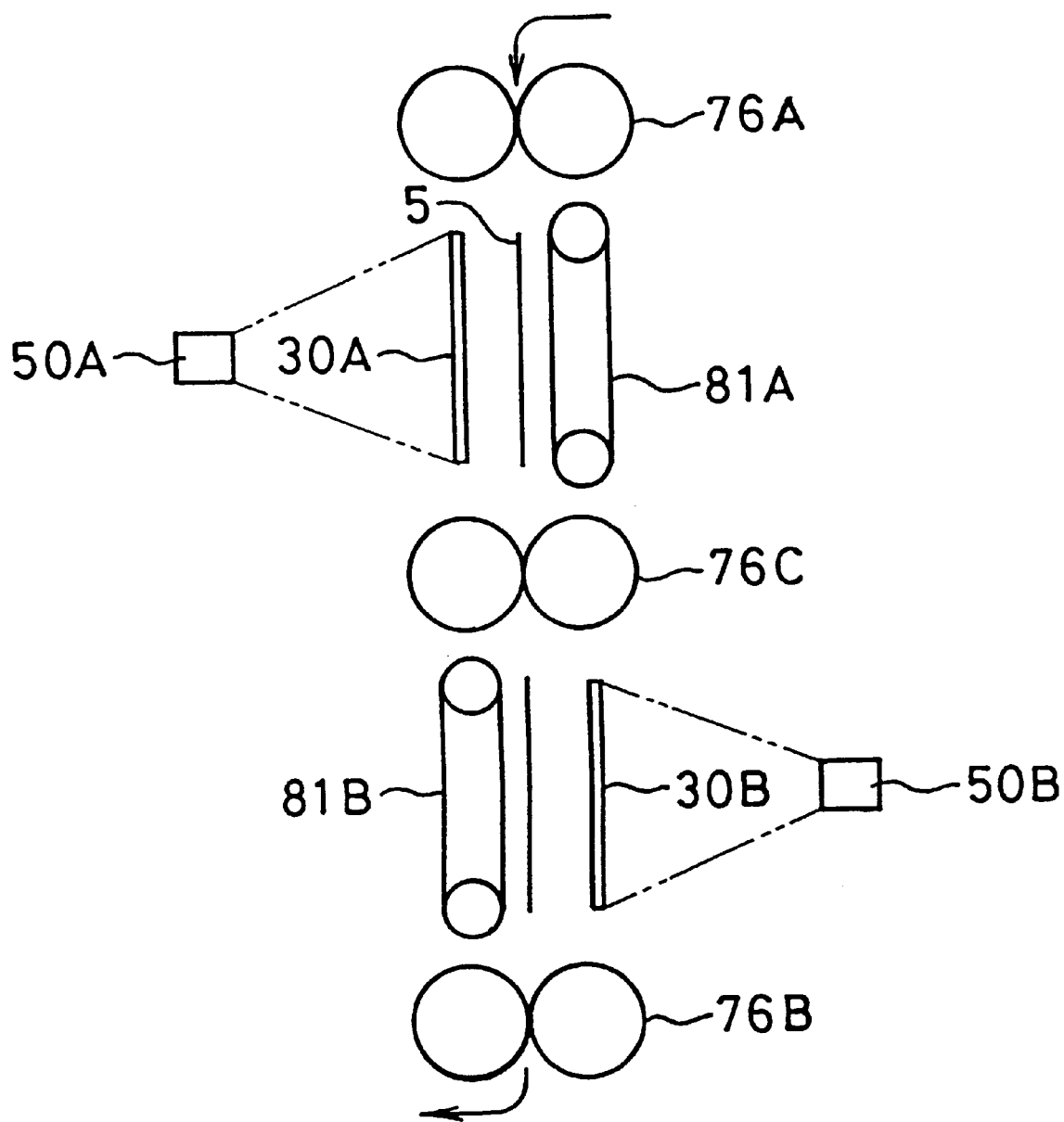
FIG. 11 is a schematic view showing a basic concept of a device for image-shooting both sides of documents according to the sixth embodiment of the present invention.

FIG. 11 represents a schematic view showing the fifth embodiment of the present invention for image-shooting both sides of a document. Arrows shown in the figure represent the travel direction of the document 5.

According to the present embodiment, the document 5 is image-shot during a vertical transportation at two stages one shot being on one side followed by a shot on the other side, as is the case with Embodiment 3 or 4 shown in FIG. 8 or 9.

Referring to FIG. 11, the upper transport system 20 (FIG. 3) comprises a transporting roll unit 76A which feeds a document 5 vertically, one side of which is image-shot by a video camera 50A via a glass plate 30A in a holizontal direction of the camera. The document 5 may freely descend or may be transported by means of a transporting belt 81A. The document is subsequently fed to a transporting roll unit 76C disposed between upstream and downstream image-shooting systems so as to be guided further to the downstream image-shooting system which shoots the other side of the document 5 by a video camera 50B via a glass plate 30B. The document 5, after having been shot on both the sides, is further guided to the lower transport system 40 (FIG. 3).

According to the image-shooting system of the present embodiment, the gravity can be utilized for transporting the document vertically, so that components necessary for transporting the document can be eliminated. On the other hand, the travelling speed of the document can be controlled by the transporting belts 81A, 81B within the image-shooting area, so that the timing between the transporting and the image-shooting can be matched more easily.

Embodiment 7

Figure 12:
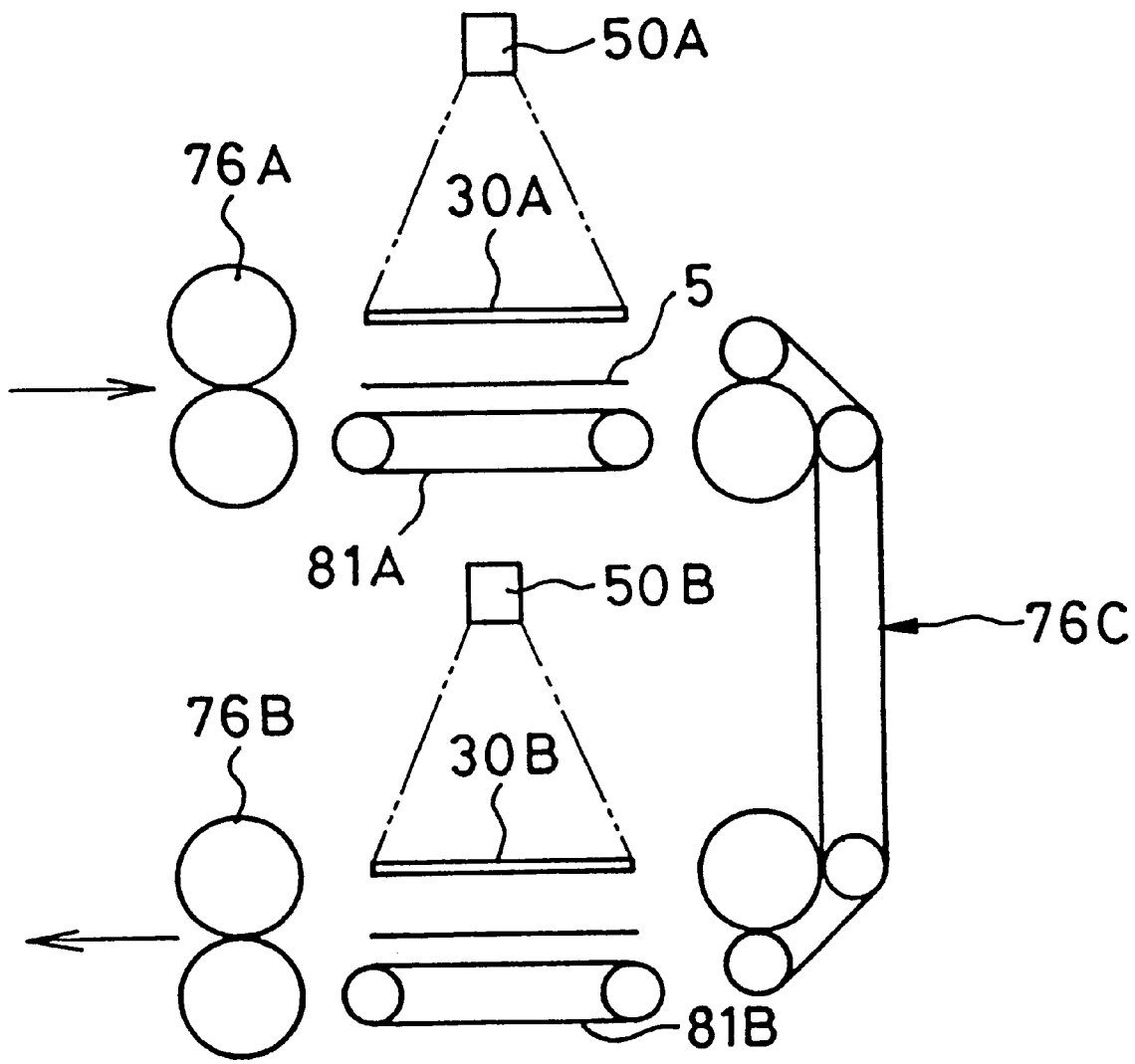
FIG. 12 is a schematic view showing a basic concept of a device for image-shooting both sides of documents according to the seventh embodiment of the present invention.

FIG. 12 represents a schematic view of the 7th embodiment of the present invention for an image-shooting system of both sides of documents. Arrows in the figure represent the travelling direction of the document 5.

According to the present embodiment the document (target object) is fed horizontally as contrasted to the sixth embodiment, whereupon one-side image-shootings are carried out subsequently side by side. The document 5 travels substantially along a U-shped line passing through two pathways for image-shooting areas disposed in different levels.

Referring to FIG. 12, the document 5 which is vertically fed from the upper transport system 20 (FIG. 3) via a pair of transporting rolls 76A is further vertically transported by a transporting belt 81A supporting the lower (one) side of the document 5, with the upper (the other) side thereof being free. The upper side (free side) of the document 5 is image-shot by a video camera 50A via a glass plate 30A in a vertical direction from the above. Then the document 5 is vertically fed to an image-shooting area at the downstream by means of an auxiliary roll unit for vertically transporting the document 5. In the downstream image-shooting area, the document 5 is further transported horizontally, with said one side of the document 5 being free directed above, while the other side of the document 5 being supported by a transporting belt 81B. Said one side (free side) is image-shot by a camera 50B disposed above the transporting belt 81B of the downstream, via glass plate 30B, this image-shooting being done in a vertical direction from the above. Thereafter, the document 5 is further fed to the lower transport system 40 (FIG. 3), guided via a transport roll unit 76B. The auxiliary roll unit 76C comprises an upper roll and a lower roll and an endless guiding belt system with four rolls, i.e., two end rolls and two intervening deflecting rolls, in which the belt is placed so as to circulate around the four rolls. Each of the end rolls is disposed so as to serve to deflect the transporting direction of the document by 90 degrees. The camera 50B is disposed just below the transporting belt 81A at the upper stage.

According to the present embodiment, the travelling pathway of the document is shortened in the vertical direction, as well as matching of the timing between the transporting and the image-shooting becomes easier by controlling the travel speed of the document 5 by adjusting the speed of the transporting belts 81A, 81B.

Embodiment 8

Figure 13:
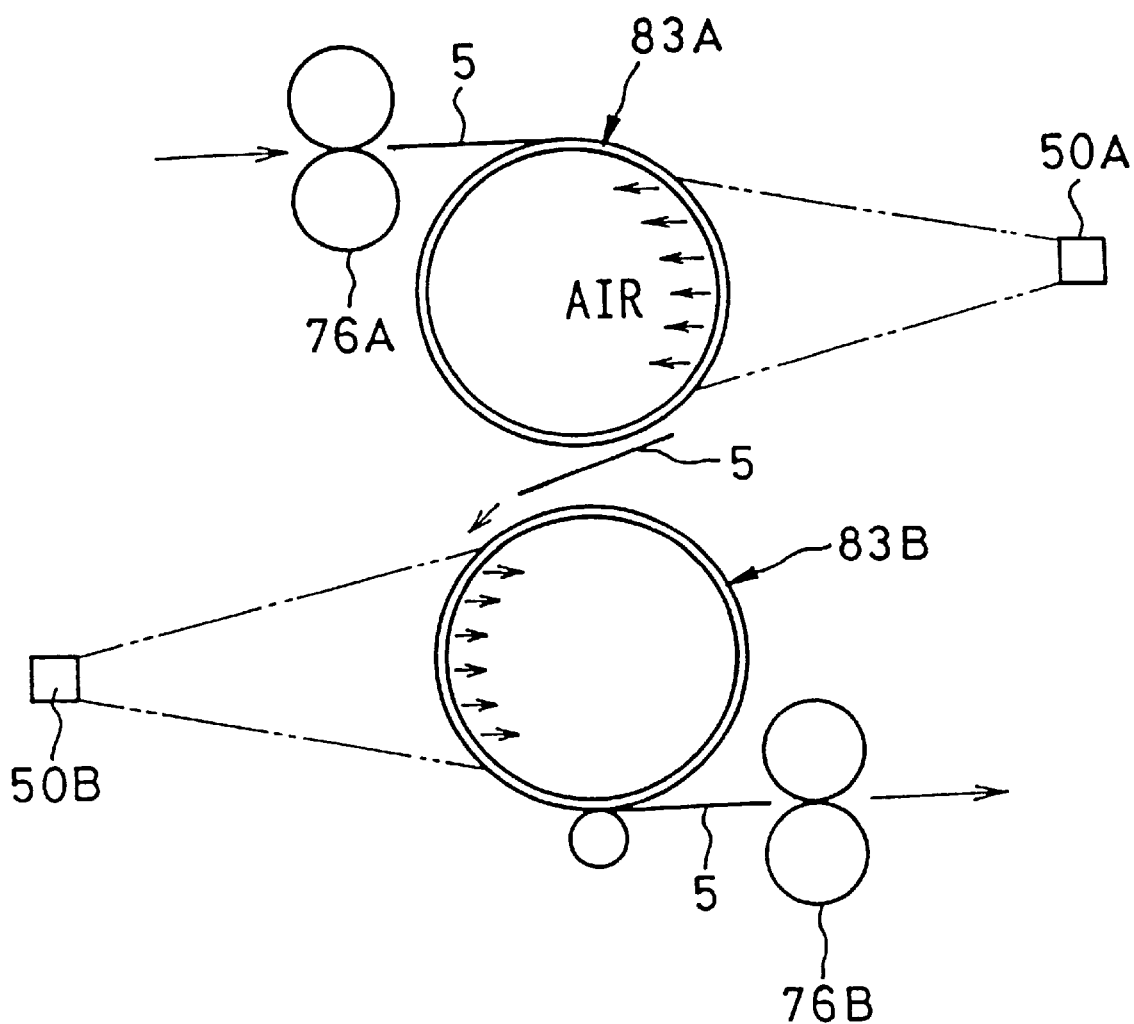
FIG. 13 is a schematic view showing a basic concept of a device for image-shooting both sides of documents according to the eighth embodiment of the present invention.

FIG. 13 represents a schematic view showing the 8th embodiment of the present invention for image-shooting both sides of documents. Arrows in the figure represent the travelling direction of the document 5.

According to the present embodiment the document is transported along a line substantially of S (reversed), as contrasted to the 6th and 7th embodiments and the image-shooting is carried out side by side consecutively.

Referring to FIG. 13, an image-shooting system of the present embodiment comprises, in the order from the upstream, a transporting roll unit 76A of the upper transport system 20 (FIG. 3), vacuum rolls 83A, 83B, an auxiliary roll of a small diameter, and a transporting roll unit 76B. A video camera 50A is disposed opposing the upper vacuum roll 83A, which video camera 50B is disposed opposing the lower vacuum roll 83B. The vacuum rolls 83A, 83B inspire air toward inside of the rolls and rotate in the direction for transporting the document 5.

According to the image-shooting system of the present embodiment, the docuemt 5 fed from the transporting unit 76A is inspired to the vacuum roll 83A rotating in the transporting direction (here, clockwise). The document 5, being inspired with one side thereof, is transported by rotation into an angular range (image-shooting area), of the video camera 50A as shown by two-dot line directing the other side of the document free to the camera 50A. At this moment, the camera 50A shoots an image of the document 5. Thereafter, the vacuum roll 83A further rotates, whereupon the document 5 inspired to the vacuum roll 83A is further aspired by the vacuum roll 83B with the other side of the document 5.

Then the document 5 is entirely inspired to the next vacuum roll 83B and transported by rotation to a specific angular region (image-shooting area) of the camera 50B as shown by two-dot lines. Thereupon the camera 50B shoots an image of the free side (one side) of the document 5. According to further rotation of the vacuum roll 83B, the document 5 is transported to the transporting roll unit 76B for discharge passing between the auxiliary roll and the vacuum roll 83B.

According to the present embodiment the document 5 is controlled in the travelling speed within the image-shooting area by the vacuum rolls 83A, 83B, thereby achieving an easier matching of the timing between the transporting and the image-shooting, as well as a significantly reduced length of the pathway of the document.

Embodiment 9

Figure 14:
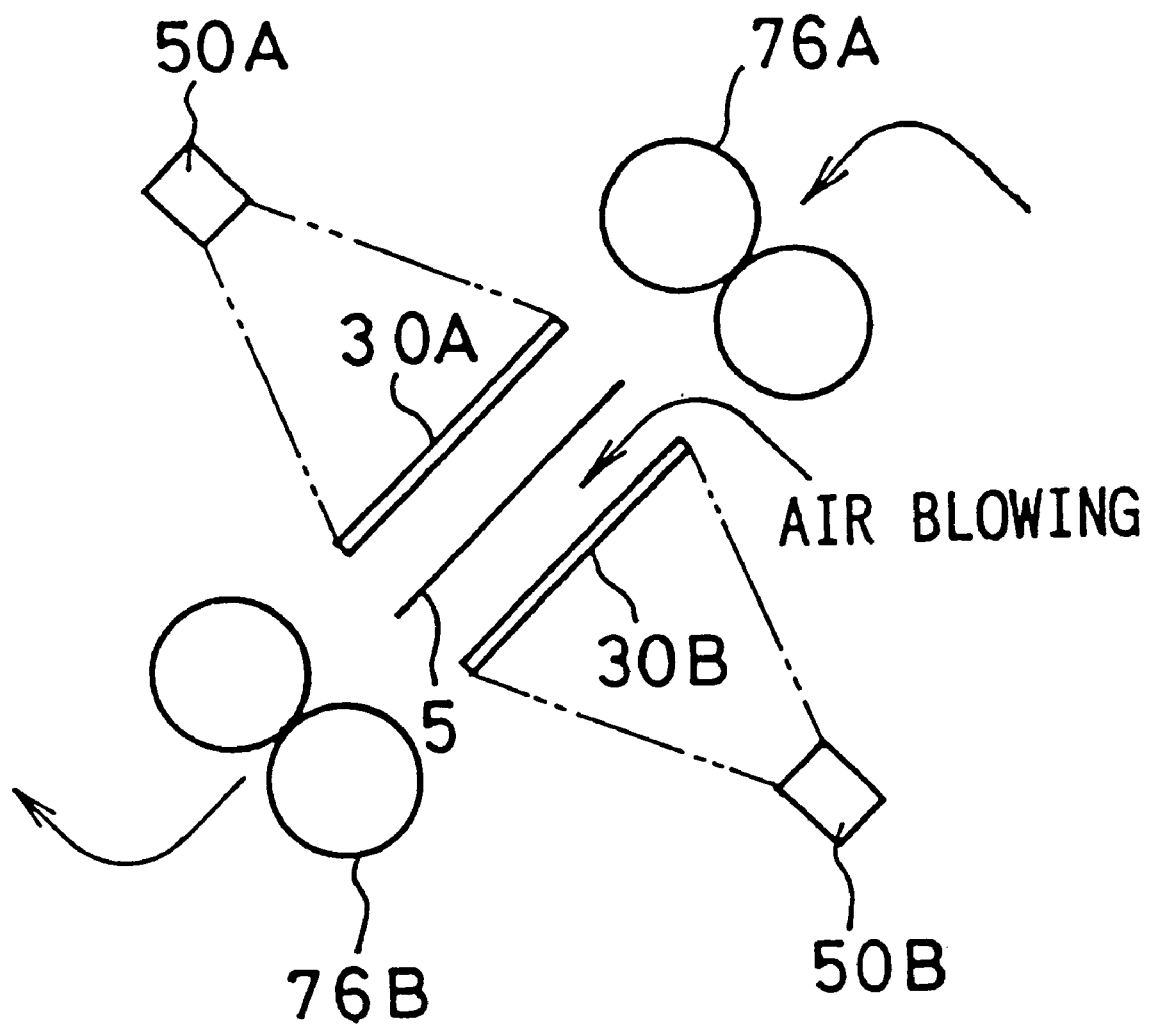
FIG. 14 is a schematic view showing a basic concept of a device for image-shooting both sides of documents according to the nineth embodiment of the present invention.

FIG. 14 represents the 9th embodiment of the present invention in a schematic view. Arrows in the figure represent the direction along which the document 5 is transported.

According to the present embodiment, the document 5 is transported along a surface tilted from the vertical or horizontal surface, which is capable of conducting simultaneous two-side image-shooting as contrasted to the embodiments according to embodiments 6, 7 and 8.

Referring to FIG. 14, the document 5 is fed from the upper transport system 20 (FIG. 3) via a transporting roll unit 76A into the tilted surface. Air is blown to the lower side of the document 5 in a direction toward downstream, thereby transporting the document 5 floating it. Both sides of the document 5 are image-shot, preferably simultaneously, by cameras 50A,50B. A pair of glass plates 30A,30B form a pathway of the document 5 between themselves. After image-shooting on both the sides, the document 5 is guided to a transporting roll unit 76B and further guided to the lower transporting system 40 (FIG. 3) for discharge.

According to the present embodiment, any occurrence of adhereance and/or friction of the document 5 to the lower glass plate 30B may be prevented by applying electric voltage of the same polarity to the document 5 and the lower glass plate 30B, in place of the air blowing. Alternatively, ultrasonic vibration may be applied to the lower glass plate 30B thereby transporting the document 5. In this case utilizing the ultrasonic vibration, the entire system including the glass plates 30A,30B may also be constructed for the horizontal transport of the document 5.

Figure 15:
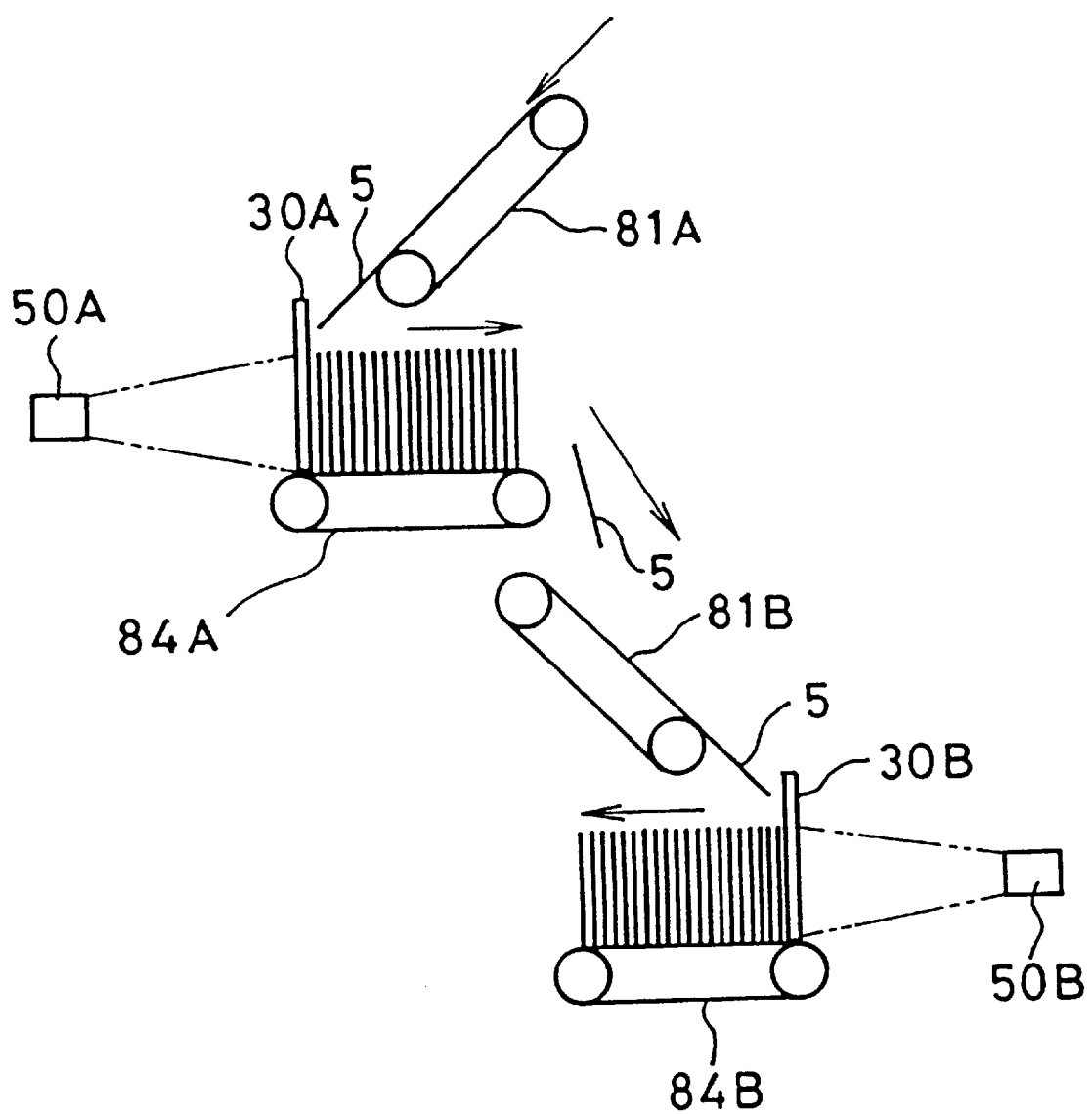
FIG. 15 is a schematic view showing a basic concept of a device for image-shooting both sides of documents according to the tenth embodiment of the present invention.

FIG. 15 represents a schematic view according to the 10th embodiment of the present invention for image-shooting documents on both the sides. Arrows in figure represent the travelling direction of the document 5.

According to the present embodiment, the image-shooting is conducted on the document transported along a surface tilted from the horizontal or vertical plane, in which consecutive image-shootings are taken side by side on the document.

Referring to FIG. 15, in an upstream image-shooting system (image-shooting area), the document 5 fed from a transporting belt 81A along the tilted surface is tentatively stored on a low speed feeding belt 84A neighboring and bearing to a glass plate 30A disposed at one end of the feeding belt 84A. One side of the document 5 last stored on the feeding belt 84A. Thereafter the document 5 image-shot on the one side is further fed in order to the other end of the feeding belt 84A, thereat falling onto a subsequent tilted transporting belt 81B, which further transports the document 5 to a downstream system for image-shooting (image-shooting area). Here the same process proceeds as the upstream system for image-shooting the other side of the document 5 by another camera 50B.

According to the present embodiment, the documents 5 are tentatively stored along the horizontal direction on the low speed belt. However, the storing of the documents 5 may be done in a different direction, e.g., in a vertical direction or a tilted direction to the holizontal direction. In the latter case, the camera angle for the cameras as 50A, 50B should be adjusted according to the tilted angle of the storing direction of documents.

According to the present embodiment the document 5 is spontaneouly brought to a still state in the image-shooting area, the timing for image-shooting is quite easy to set, and a longer time for the image-shooting is permitted.

Embodiments of the Fourth Aspect

Referring to the FIGS. 16–19, preferred embodiments of the fourth aspect will be explained.

First Example

Figure 16:
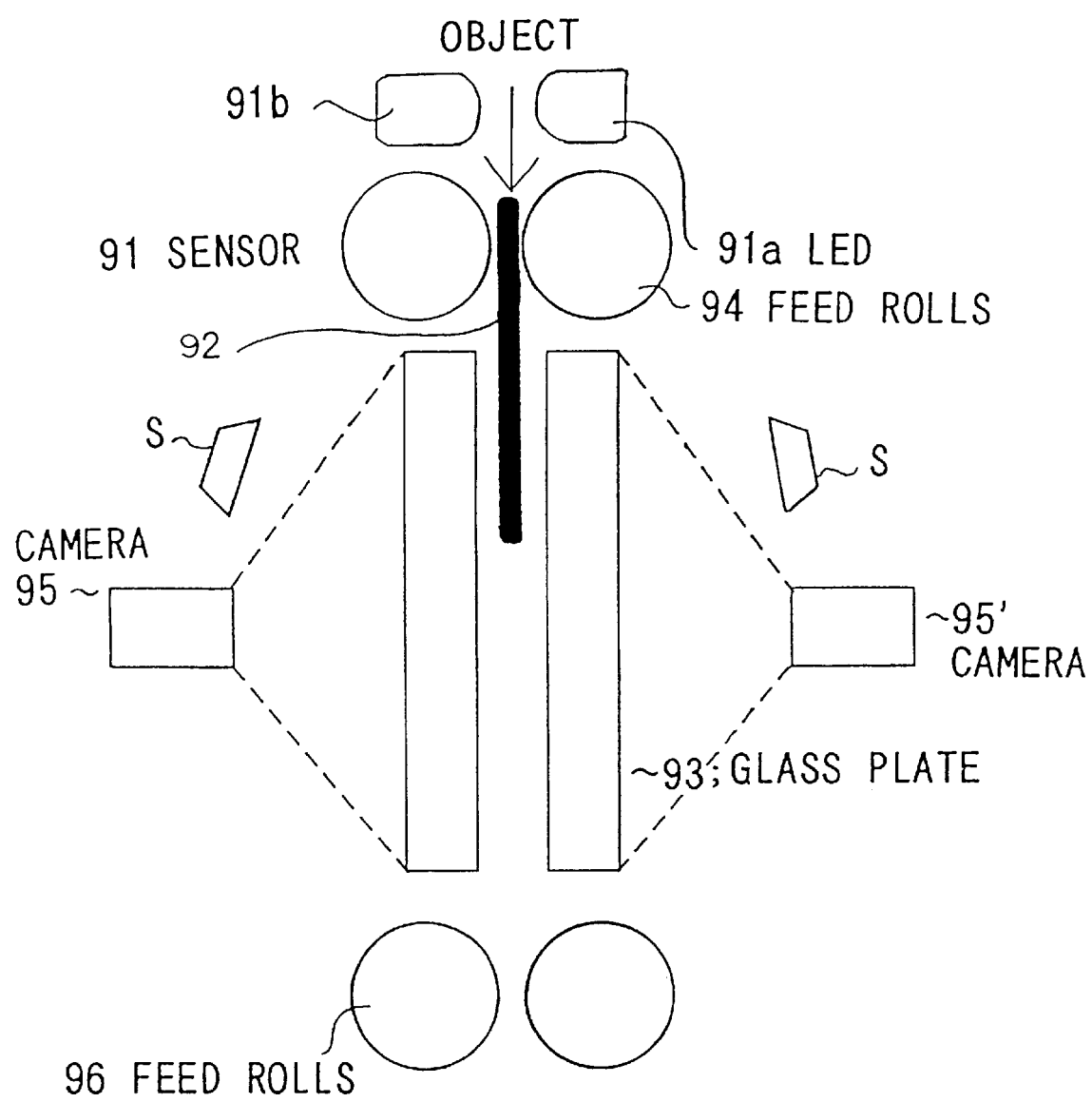
FIG. 16 illustrates a document image-shooting device according to a first example of the fourth aspect.

FIG. 16 schematically illustrates an arrangement of a document image-shooting device according to an example of the fourth aspect.

Referring first to FIG. 16, a document image-shooting device of the present example includes an optical sensor 91 having, for image-shooting an instrument 92, as an example of the document, a light emitting element, such as LED (hereinafter being an LED), and a light receiving element 91b, comprised of a phototransistor for sensing light outputted by the LED 91a. The document image-shooting device also includes upper feed rolls 94 for guiding and transporting the instrument 92 to an image-shooting area between glass plates 93, a pair of area CCD cameras 95 for image-shooting the instrument 92 and lower feed rolls 96 for receiving the image-shot instrument 92. The upper feed rolls 94 may also be arranged upstream of the optical sensor 91. The optical sensor 91 detects the instrument 92 descending from above by the light outputted by the LED 91a being shielded by the instrument 92. A pair of stroboscopes S, are provided on both the lateral sides of the glass plates 93. The stroboscopes emit light responsive to the detection signal for the instrument 92, outputted by the optical sensor 91, for illuminating both sides of the instrument. These sides of the instrument 92 are image-shot by the area CCD cameras 95.

FIG. 17 is a timing chart for illustrating the method of image-shooting a document according to an embodiment of the fourth aspect.

Referring to FIGS. 16 and 17, an optical sensor (optical sensor 91 of FIG. 16) outputs a high level during passage (travel) of a paper, that is a document, such as instrument 92. As long as the optical sensor outputs a low level, there is no instrument 92 present on the detection line of the optical sensor 91. At a time point when a pre-set time t has elapsed as from the time point when a decay time of the sensor output signal waveform, that is the rear end of the instrument, has been detected, the instrument 92 detected by the optical sensor 91 is image-shot by the area CD camera 95 i.e., two-dimensional CD camera).

The constant time t is pre-set depending upon the distance from the detection line of the optical sensor 91 to the centerline of the image-shooting area of the area CCD camera 95 and the transport speed of the instrument 92. This image-shooting method is convenient for image-shooting a fixed-size document, such as an instrument.

Second Example

FIG. 18 is a timing chart for illustrating the method for image-shooting the document according to the second example of the fourth aspect. The present example utilizes an image-shooting device similar to one for the first example shown in FIG. 16.

Referring to FIGS. 16 and 18, a sensor (optical sensor 91 of FIG. 16) outputs a high-level signal during passage of a paper sheet (document such as instrument 92). As long as a low-level signal is outputted, there is no instrument 92 present on the detection line of the optical sensor 91. The time td which elapses as from the rise of the sensor output signal waveform until its decay, that is from on-time until off-time, is the time during which the instrument 92 is traversing the detection line of the optical sensor 91. That is, since the time td is the time during which the entire length of the instrument (document) 92 along the direction of descent traverses the detection line, the entire length of the instrument 92 can be detected from this time td.

The movement velocity (speed of descent) of the instrument 92 may be deemed to be substantially constant since the transport device, not shown, driven by a motor, is transporting the object at a constant velocity.

If the time during which the center (which may also be a leading end or a trailing end) of the instrument 92 descends from the detection line of the optical sensor 91 to substantially the center of the image-shooting range of the area sensor is T, the time during which the optical sensor 91 is detecting the descending instrument 92 is td and the time which elapses as from the end of detection of the descending instrument 92 by the optical sensor 91, that is the time point of decay, that is transition time to turn-off from turn-on, of the sensor output signal waveform of FIG. 18, until the time the center position of the instrument 92 descends as far as the center position of the image-shooting range of the area CCD camera 95, is t, the center position of the image-shooting range of the area CCD camera 95 coincides with the centerline of the descending instrument 92, after lapse of the time t calculated by the equation:

$$t = T - td$$

At this time, the area CCD camera 95 image-shoots the instrument 92 descending at the center position of the image-shooting range.

In this manner, the object can be captured at all times at the center of the image-shooting range by measuring the detection time of the descending instrument 92 by the optical sensor 91 (traversing time of the instrument 92) for indexing the length of the instrument 92 and by shifting the image-shooting timing responsive to the length of the instrument.

Third Example

FIG. 19 is a timing chart for illustrating the method for image-shooting a document according to a third example of the present aspect. The present example utilizes an image-shooting device of the first example (shown in FIG. 16).

In FIG. 19, the time t2 denotes the time which elapses as from detection of the leading end of the instrument 2 by the optical sensor 1 until the center of the instrument 2 reaches the center position of the image-shooting range for effectuating image-shooting.

Referring to FIGS. 16 and 19, a sensor (optical sensor 91 of FIG. 16) outputs a high-level (on-level) signal during passage of a paper sheet (document such as instrument 92). As long as a low-level (off-level) signal is outputted, there is no instrument 92 present on the detection line of the optical sensor 91. At a time point when a pre-set time t2 has elapsed as from the rise (turn-on from turn-off) of the sensor output signal waveform, that is as from the time of detection of the leading end of the instrument, the instrument 92 detected by the optical sensor 91 is image-shot by the area CCD camera 95.

The time t2 is pre-set depending upon the distance from the detection line of the optical sensor 91 to the centerline of the image-shooting area of the area CCD camera 95 and the transport speed of the instrument 92. This image-shooting method is convenient for image-shooting a fixed-size document, such as an instrument, in particular an instrument of an elongated size, since the method of the present example captures the leading end of the instrument.

Although the foregoing description has been made with reference present aspect has been explained with reference to preferred examples of the present aspect, it is to be noted that these examples are merely illustrative and various other modifications may be comprised within the scope of the invention.

According to the fourth asepct of the present invention, as described above, there is no risk that the produced image of the descending document be lost partially, thus improving image-shooting reliability and image quality. In addition, image shooting may be executed at a constant position within the image-shooting range by detecting the descending document and indexing the size of the document preferably along the direction of descent. Furthermore, the transport velocity of the document to be image-shot may be improved with a shorter image-shooting interval.

It should be noted that any modification from the embodiments may be done without departing from the gist of the present invention within the concept and scope as disclosed herein and claimed hereinbelow.

What is claimed is:

1. A device for image-shooting both surfaces of a document comprising:

a first transport system for feeding said document downstream; and image-shooting means provided along said first transport system for two-dimensionally image-shooting both surfaces of said document fed by said first transport system, said image-shooting means having (1) a first image shooting area for image shooting a first side of said document, and (2) a second image shooting area for image shooting a second side of said document;

wherein said first transport system allows said document to travel via gravity as a motive force between said first and said second image shooting areas.

2. A device for image-shooting both surfaces of a document comprising:

a first transport system for feeding said document downstream; and image-shooting means disposed downstream of said first transport system for two-dimensionally image-shooting both surfaces of said document fed by said first transport system;

wherein said document travels, via gravity as a motive force, within an image-shooting area of said image-shooting means.

3. A device for image-shooting both surfaces of a document comprising:

a first transport system for feeding said document downstream;

image-shooting means disposed downstream of said first transport system for two-dimensionally image-shooting both surfaces of said document fed by said first transport system; and a pair of tilted guide members disposed downstream of said first transport system and opposing each other for guiding said document through an image-shooting area of said image-shooting means;

wherein said document is floatedly transported through a space defined between said pair of tilted guide members by blown air supplied to a surface of said document.

4. A device for image-shooting both sides of a document comprising:

an upper transport system for feeding said document;

a pair of transparent guide members to guide said document fed from said upper transport system, such that said document travels between said pair of transparent guide members via gravity as a motive force, each of said pair of transparent guide members having a guide surface of a larger area than said document;

a pair of image-shooting apparatuses each facing a respective one of said pair of transparent guide members to image-shoot a respective side of said document as it passes through said pair of transparent guide members, via gravity as a motive force.

5. A device as defined in claim 4, wherein each of said pair of image-shooting apparatuses comprises:

an area sensor which image-shoots said document via a lens system;

a stroboscope which emits light in synchronous with an instant said document enters an image-shooting area of said area sensor; and an image recording device which records image signals generated by said area sensor.

6. The device as defined in claim 4 or 5, further comprising a lower transport system which receives said document from said pair of transparent guide members and forwards said documents for discharge.

7. A device for image-shooting a document comprising:

an upper transport system which feeds said document downstream by allowing said document to travel, via gravity as a motive force; and an image-shooting apparatus disposed downstream of said upper transport system to image-shoot a surface of said document as it travels via gravity as a motive force.

* * * * *